United States Patent [19]

Timmers

[11] Patent Number: 5,400,093
[45] Date of Patent: Mar. 21, 1995

[54] IMAGE PROJECTION SYSTEM WITH AUTOFOCUSING

[75] Inventor: Wilhelmus A. G. Timmers, Eindhoven, Netherlands

[73] Assignee: U.S. Philips Corporation, New York, N.Y.

[21] Appl. No.: 171,951

[22] Filed: Dec. 21, 1993

[30] Foreign Application Priority Data

Dec. 28, 1992 [EP] European Pat. Off. ........... 92204088

[51] Int. Cl.$^6$ ............................................. G03B 21/53
[52] U.S. Cl. ..................................... 353/101; 348/745
[58] Field of Search .................... 353/101, 122, 31, 37, 353/34; 348/745, 806

[56] References Cited

U.S. PATENT DOCUMENTS

| | | | |
|---|---|---|---|
| 3,469,925 | 9/1969 | Urbach et al. | 353/101 |
| 3,620,613 | 11/1971 | Watanabe | 353/101 |
| 3,672,757 | 6/1972 | Szymber et al. | 353/101 |
| 5,046,837 | 9/1991 | Strommer et al. | 353/82 |
| 5,276,523 | 1/1994 | Kurematsu et al. | 353/101 |

FOREIGN PATENT DOCUMENTS

| | | |
|---|---|---|
| 0266184 | 5/1988 | European Pat. Off. |
| 0395156 | 10/1990 | European Pat. Off. |
| 0467447 | 1/1992 | European Pat. Off. |
| 3141336 | 6/1991 | Japan |
| 3149538 | 6/1991 | Japan |

*Primary Examiner*—William A. Cuchlinski, Jr.
*Assistant Examiner*—William C. Dowling
*Attorney, Agent, or Firm*—Norman N. Spain

[57] ABSTRACT

An image projection device comprising at least one display panel (26, 27, 28), a projection lens system (C) and a focus error detection system (FS) is described. Since the radiation source (50) and the radiation-sensitive detector (51) of the focus error detection system are arranged in planes which effectively coincide with the plane of the display panel (28), and a focus measuring beam b traverses the projection lens system twice on its path to and from a projection screen (D), an accurate and reliable focus error signal ($S_f$) is obtained.

34 Claims, 14 Drawing Sheets

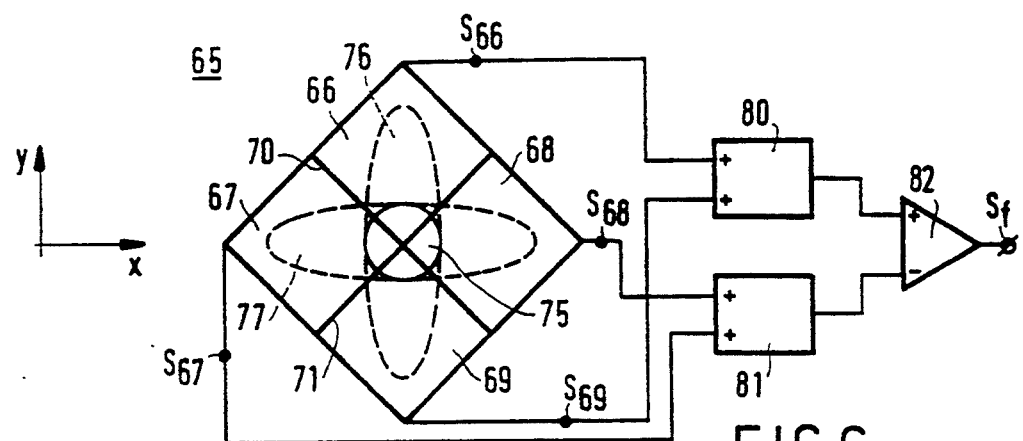
FIG.6
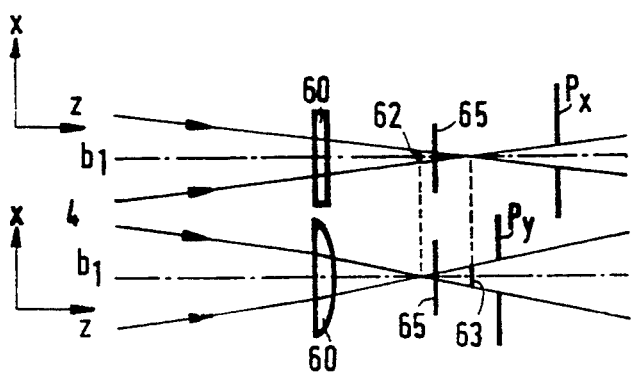
FIG. 7a
FIG. 7b
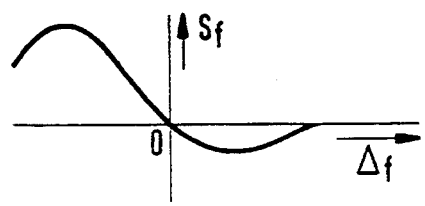
FIG.8
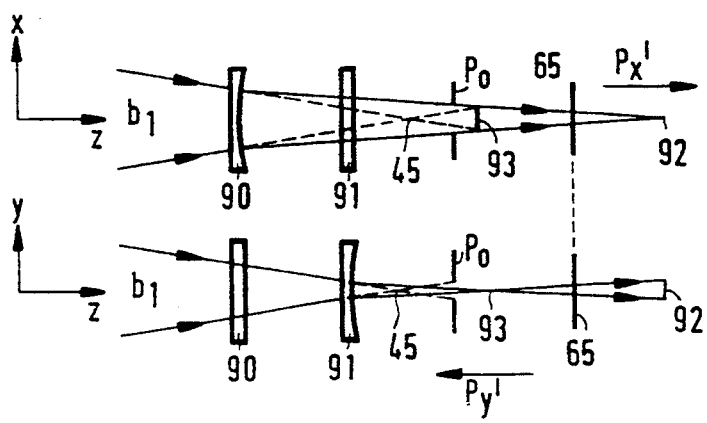
FIG.9a
FIG.9b
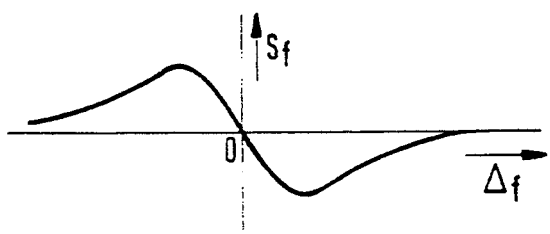
FIG.10

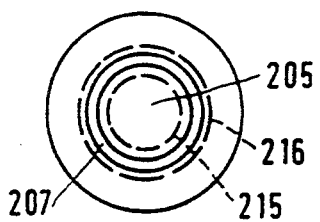 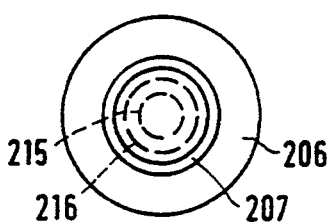 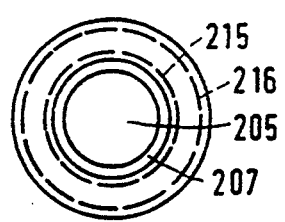
FIG.32a  FIG.32b  FIG.32c
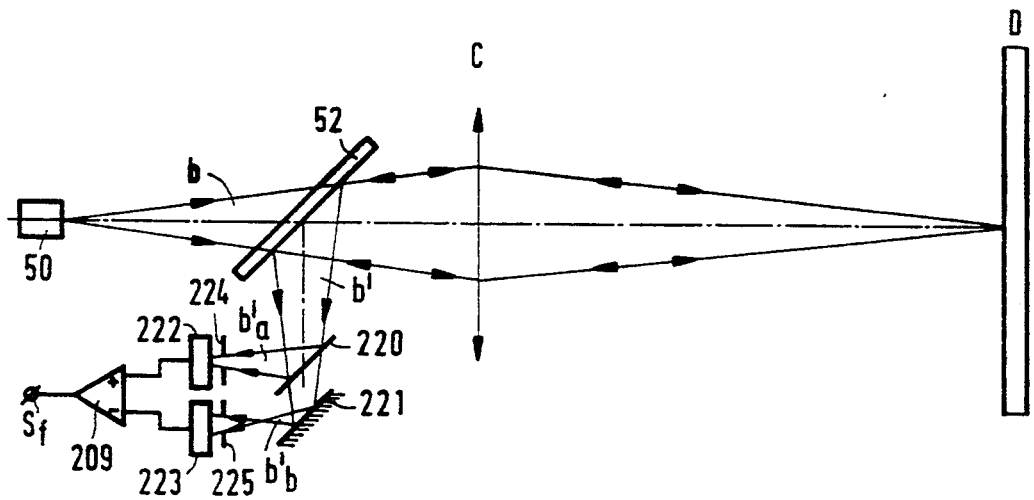
FIG.33
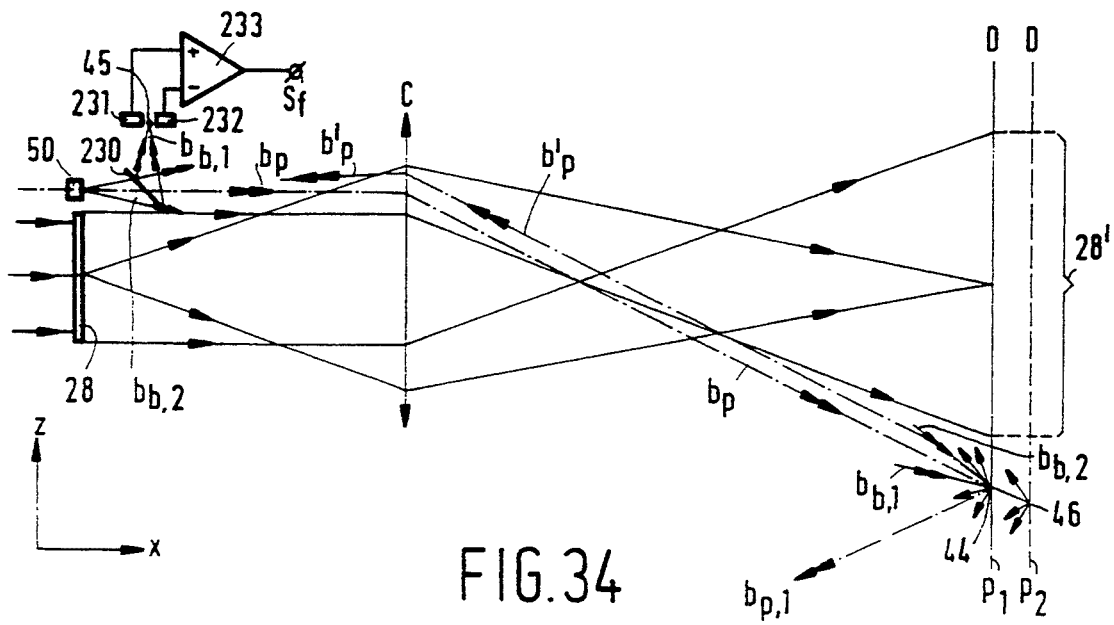
FIG.34

IMAGE PROJECTION SYSTEM WITH AUTOFOCUSING

BACKGROUND OF THE INVENTION

The invention relates to an image projection device comprising a display system having at least a display panel for generating an image to be projected, a projection lens system for projecting the image formed by the display system on a projection screen, a focus error detection system provided with an auxiliary radiation source which supplies a focus measuring beam, and a radiation-sensitive detection system for converting focus measuring beam radiation reflected by the projection screen into a focus error signal.

The term image projection device is considered to have a wide meaning and comprises a device for displaying, for example a video image, a graphic image, numerical information or a combination thereof. The images may be both monochrome and color images. In the latter case the display system may comprise three chrominance channels for, for example the primary colors red, green and blue, each accommodating a display panel. A display panel may be constituted by the display screen of a cathode ray tube but is preferably a liquid crystalline panel. In the latter case the display system comprises an illumination unit for illuminating the panel or the panels.

In the current image projection devices which comprise one projection lens system in the form of a zoom lens for projecting a magnified image on a projection screen which is present at, for example several meters from the projection device, each change of the projection distance or each change of the image size on the screen necessitates refocusing of the image by readjusting the zoom lens manually or possibly via a remote control unit. Moreover, optical elements of the image projection device may be displaced with respect to each other due to, inter alia temperature variations, so that the projected image may be defocused. The known image projection devices thus require an additional quantity of time, attention and expertise of the user. The convenience of use of an image projection device would be enhanced considerably if it were provided with an autofocus system, i.e. a system with which the distance between a display panel and the projection screen is measured and the focal length of the projection lens system is automatically adjusted with reference to said measurement.

An image projection device in which an auxiliary radiation source emits an invisible, infrared measuring beam to the screen and in which the radiation beam reflected by the screen is received by a position-sensitive detector is described in the published Japanese Patent Application (Kokai) 3-149538. The distance between the screen and a reference plane, the plane of the radiation source and/or the detector can be determined by means of this system which is referred to as triangulation system. This information is used to displace the entire projection lens system along the optical axis so that the distance between this system and the screen can be adapted to the focal length of the projection lens system. This system has the drawback that the measuring beam is optically not coupled to the projection lens system and the display panel so that it is not ensured that the focal length of the projection lens system is always adapted to the distance between the screen and the display panel.

SUMMARY OF THE INVENTION

It is an object of the present invention to provide a focus error detection system for an image projection device which is based on a novel concept and is very efficient and inexpensive. To this end the image projection device according to the invention is characterized in that the auxiliary radiation source is arranged in a plane which, viewed from the projection lens system, effectively coincides with the plane of a display panel and emits a focus measuring beam whose radiation on its path from the radiation source to the detection system traverses the projection lens system twice via the projection screen, and in that the detection system is arranged in a plane which, viewed from the objective system, effectively coincides with the plane of the auxiliary radiation source.

With the aid of this focus error detection system it is achieved that the display panel is always sharply imaged on the projection screen, independent of the distance between the projection lens system and the image projection device, by adjusting the focal length of the projection lens system.

This adjustment may be effected by moving the entire projection lens system along the optical axis with reference to the focus error signal.

An image projection device in which the projection lens system is a zoom lens is preferably further characterized in that the focus error signal is applied to an actuator for an adjustable lens group of the zoom lens.

The adjustable lens group is preferably the group referred to as front group of the zoom lens.

It is to be noted-that an image projection device in which an automatic focus error detection system controls the front group of a zoom projection lens system is described in the published Japanese Patent Application (Kokai) 3-141336. However, this Patent Application does not show how the focus error signal is generated.

The image projection device may be further characterized in that the auxiliary radiation source is present in the plane of the display panel outside this panel.

It should then be ensured that the screen is larger than the largest size of the projected image.

This is no longer necessary in a preferred embodiment of the image projection device which is characterized in that the auxiliary radiation source is arranged in a plane which is the mirror image of the plane of a display panel with respect to a partially transmissive reflector extending at an acute angle to the optical axis of the projection lens system.

This reflector is, for example, a dichroic mirror which reflects the visible light from the display panel and passes the radiation, for example infrared radiation from the auxiliary radiation source.

This embodiment is preferably further characterized in that the acute angle is an angle of 45° and in that the auxiliary radiation source is in alignment with said optical axis.

Then the focus error is measured on the optical axis of the projection lens system, which has the advantage that the focus measuring beam is perpendicularly incident on the projection screen and the greater part of the measuring beam radiation is reflected towards the detector.

There is a large number of embodiments of the image projection device, which embodiments can be arranged in a number of classes.

A first class of embodiments is characterized in that an astigmatic element is arranged in the part of the path of the measuring radiation reflected by the projection screen between the projection lens system and the detector and outside the path of the focus measuring beam emitted by the radiation source, and in that the detector is a four-quadrant detector. Different embodiments of this class, in which use is made of the method referred to as astigmatic focus detection method, are described in claims 8 to 15.

The reflected focus measuring beam is the beam formed by that part of the focus measuring beam radiation reflected by the projection screen which passes through the projection lens system again and can reach the detector. Since the projection screen must spread the signal light of the display system over a large viewer's space, this screen behaves as a diffuse reflector for the focus measuring beam. As a result, only a part of the focus measuring beam radiation reflected by the projection screen enters the projection lens system again so as to be concentrated on the detector. The intensity of this part of the reflected focus measuring beam is sufficiently large to generate a usable focus error signal.

A second class of embodiments is characterized in that a radiation obstructive element is arranged in a plane in which the reflected focus measuring beam from the projection screen is focused if the focus measuring beam is focused on the screen, said element coveting approximately half the reflected focus measuring beam, and in that the detector comprises two detection elements which are arranged at different sides of the chief ray of the reflected focus measuring beam.. The embodiments of this class, in which use is made of the principle referred to as single or double Foucault focus detection principle, are described in claims 17 to 24, 33 and 34.

An embodiment of the third class is characterized in that the detector is arranged outside the plane in which the reflected focus measuring beam is focused if the focus measuring beam is focused on the screen and in that the detector comprises a first, circular detection element situated on the chief ray of the reflected focus measuring beam and a second, annular detection element whose inner radius is larger than the radius of the first detection element.

An alternative embodiment is characterized in that a conical radiation-transmission element is arranged in the part of the path of the reflected focus measuring beam from the projection screen between the projection lens system and the detector and outside the path of the focus measuring beam emitted by the radiation source, and in that the detector comprises a first, circular detection element situated on the chief ray of the reflected focus measuring beam and a second, annular detection element whose inner radius is larger than the radius of the first detection element.

An embodiment of the fourth class is characterized in that the detector comprises two detection elements whose entrance apertures are located at a first and a second distance, respectively, from the projection lens system, the first and the second distance being larger and smaller, respectively, than the distance between the projection lens system and the plane in which the reflected focus measuring beam is focused if the focus measuring beam is focused on the projection screen.

A fifth class of embodiments is characterized in that the radiation source emits a narrow focus measuring beam which traverses the projection lens system eccentrically, said system receiving the reflected focus measuring beam and concentrating said beam on the detector comprising two detection elements.

A preferred embodiment of this class is characterized in that the chief ray of the focus measuring beam extends at an acute angle to the optical axis of the projection lens system. Due to the oblique incidence of the focus measuring beam in the projection lens system, elements of this system are prevented from reflecting radiation towards the detector.

A sixth class of embodiments is characterized by means for periodically displacing the focus of the measuring beam along the optical axis of the projection lens system by a single detector having such an entrance aperture that it receives a maximum quantity of radiation if the focus measuring beam is focused on the projection screen, and by a signal processing circuit connected to the output of the detector for comparing the detector signal with a control signal for the means for periodically displacing the focus.

By periodically moving the measuring beam focus, a detector signal having a satisfactory signal-to-noise ratio is obtained. Measures for obtaining a dynamic focus error signal can also be taken in the other classes of embodiments.

The seventh class of embodiments is characterized in that an element having a refractive index $n_1$ is arranged in the part of the path of the reflected focus measuring beam between the projection lens system and the detector and outside the path of the focus measuring beam emitted by the radiation source, said element being arranged at such an angle that, if the focus measuring beam is focused on the projection screen, the rays of the reflected beam are incident on the element at angles which are approximately equal to arcsin $n_2/n_1$ in which $n_2$ is the refractive index of the medium surrounding the element, and in that the detector comprises separate detection elements for the two beam halves of the reflected focus measuring beam.

BRIEF DESCRIPTION OF THE DRAWING

These and other aspects of the invention will be apparent from and elucidated with reference to the embodiments described hereinafter. In the drawings FIGS. 4 to 16 show the principle and different embodiments of an astigmatic focus error detection system in the device according to the invention, FIGS. 29 to 32c show the principle and different embodiments of a focus error detection system in which use is made of the principle of widening the radiation spot on the detector at defocusing, FIG. 33 shows a focus error detection system with actually shifted detection elements to be used in the device, FIG. 34 shows a focus error detection system with a narrow measuring beam eccentrically traversing the projection lens system.

DETAILED DESCRIPTION OF THE PREFERRED EMBODIMENTS

Figure 1:
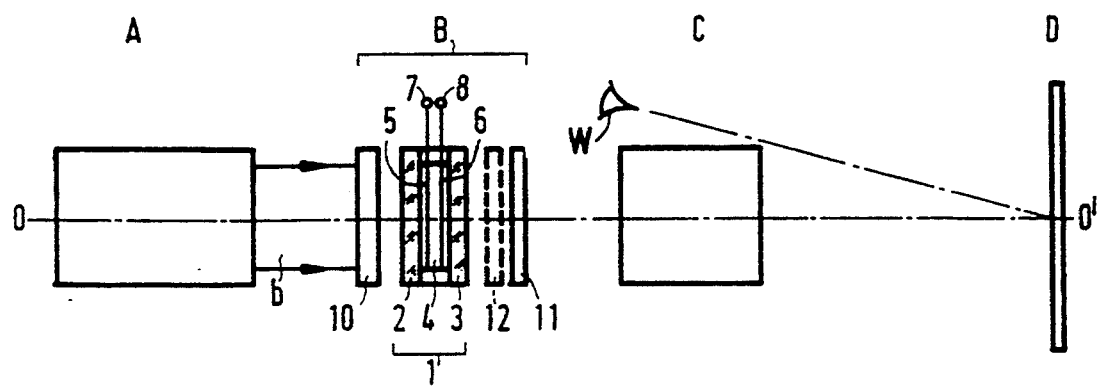
FIG. 1 shows the diagram of a known image projection device.

In FIG. 1 the block A denotes an illumination system emitting a light beam b whose chief ray coincides with the optical axis OO' of the image projection apparatus. This beam is incident on the image display system B which, in the case of projecting a monochromatic image, comprises one display panel 1. This panel is, for example a liquid crystalline panel (or LCD, Liquid Crystal Display panel). Such a panel comprises a layer of liquid crystalline material 4, for example of the nematic type which is enclosed between two transparent, for example glass plates 2 and 3. Drive electrodes 5 and 6 are arranged on each plate. These electrodes may be arranged in a large number of rows and columns, thus defining a large number of pixels in the display panel. The different pixels are driven by driving the matrix electrodes as is diagrammatically shown by means of the drive terminals 7 and 8. Thus, an electric field can be applied at the desired positions across the liquid crystalline material 4. Such an electric field causes a variation of the effective refractive index of the material 4 so that the light passing through a given pixel undergoes or does not undergo a rotation of the direction of polarization, dependent on the absence or presence of a local electric field at the location of the relevant pixel.

Instead of this passive-drive image display panel, an active-drive panel may be used. In the last-mentioned display panel one of the supporting plates comprises an electrode while the other plate is provided with the semiconductor drive electronics. Each pixel is now driven by its own active drive element such as, for example a thin film transistor. Both types of direct-drive display panels are described in, for example European Patent Application no. 0 266 184.

The beam incident on the display panel 1 should be polarized, preferably linearly polarized. However, the illumination system A produces unpolarized light. A linearly polarized component having the desired direction of polarization is selected from this light by means of a polarizer 10. An analyser 11 whose direction of polarization is, for example effectively parallel to that of the polarizer 10 is arranged in the path of the light passed by the display panel. Consequently, the light from those pixels which are energized and which do not change the direction of polarization of the beam is passed by the analyser towards a projection lens system C. The light from the non-energized pixels which rotate the direction of polarization of the beam through 90°, is blocked by the analyser. The analyser thus converts the polarization modulation of the beam into an intensity modulation. The projection lens system C projects the image formed on the panel 1 on a projection screen D. This projected image can be watched by a viewer W.

The illumination system may comprise a high-power lamp, a reflector arranged at one side of the lamp and a condensor system arranged at the other side of the lamp. This condensor system may be implemented as described in U.S. Pat. No. 5,046,837 and has not only a large light-collective power but also a low throughput so that the numerical aperture and cross-section of further optical elements in the projection device, such as the projection lens C, may remain limited, which has a favourable effect on the cost price of the device.

The illumination system is preferably implemented as described in EP Patent Application no. 0 395 156, which corresponds to U.S. Pat. No. 5,098,184 and comprises two lens plates as extra elements. It is thereby achieved that the cross-section of the illumination beam at the area of a display panel corresponds to the surface area of this panel to be illuminated and that this beam has a uniform intensity distribution. The available light is then used to an optimum extent and the image on the projection screen has a uniform brightness.

An illumination system which has optimum properties as far as the use of light is concerned and which is preferably used in the image projection device is described in European Patent Application no. 0 467 447, which corresponds to U.S. Pat. No. 5,184,248. This illumination system comprises a special polarization-sensitive beam splitter and a polarization rotator. The beam splitter splits the incident illumination beam into two sub-beams having different directions of polarization, one of which is directly suitable for modulation by the display panel. The polarization rotator converts the second sub-beam into a beam having the same direction of polarization as the first sub-beam. The sub-beams exiting from the combination of beam splitter and polarization rotator jointly constitute one beam which passes through the display system with the suitable direction of polarization.

Said embodiments of the illumination system have been found very useful in practice, because they yield a large light intensity per surface unit on the projection screen, in spite of the fact that a liquid crystalline display panel has a low transmission and, moreover, is imaged in a magnified form.

When the image projection device described above is used, the user will first have to focus the projected image on the projection screen manually, i.e. he will have to adapt the focusing of the projection lens to the distance between the plane of a display panel and the screen. During use, this distance may change due to, for example temperature variations within the projection device, or when the projection screen is moved. Then the user must focus again. Moreover, the projection lens may be in the form of a zoom lens for adjusting the size of the projected image or a part of this image. For a conventional image projection device such a zoom lens will not only have to comprise a main lens group, a front lens group and a variator lens group with which the image size is adjusted, but also a compensator lens group with which the focus variation due to the movement of the variator group is compensated. By providing the image projection device with an automatic focus servosystem according to the invention, not only the manual focus setting may be dispensed with but it is also sufficient to use a zoom lens comprising the three first-mentioned lens groups only. In fact, a focus error caused by zooming is now detected by means of the focus servosystem and eliminated by moving the front lens group. A zoom lens having three lens groups can be made at lower cost than a zoom lens having four lens groups, which is important, particularly for consumer apparatuses.

Figure 2:
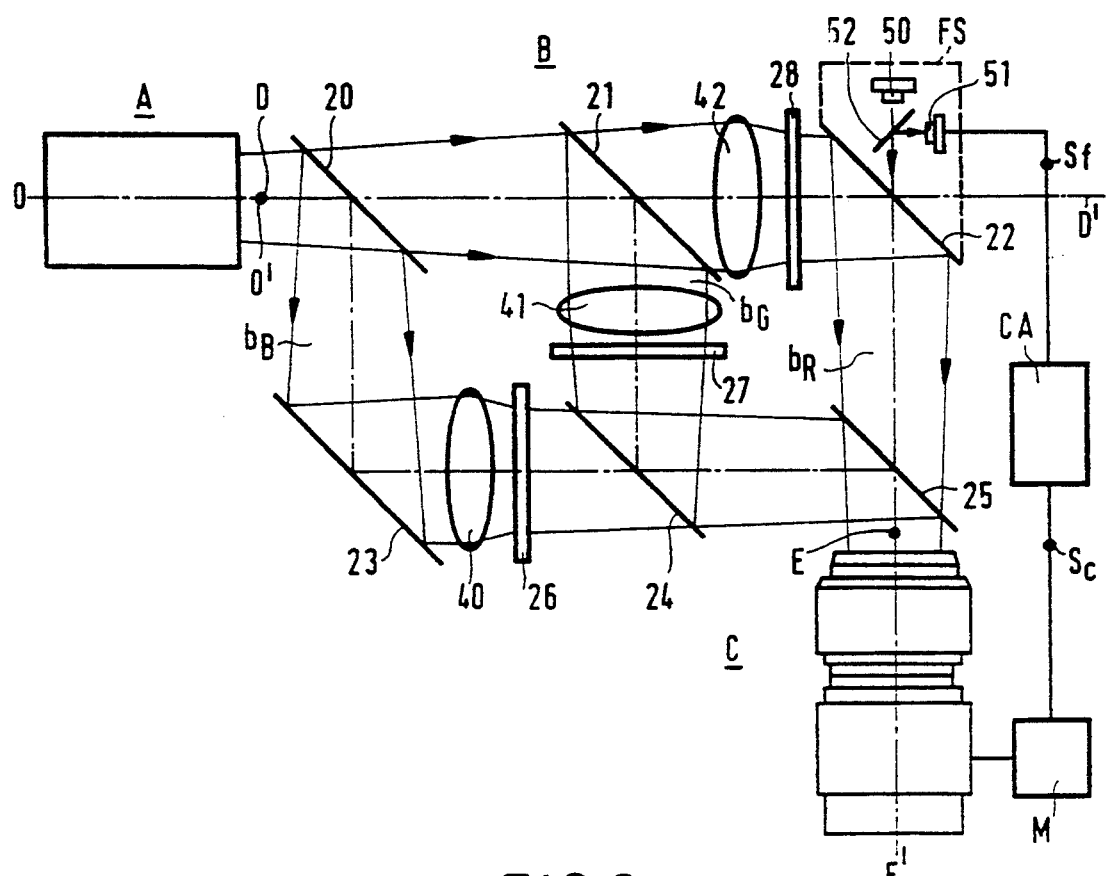
FIG. 2 shows an image projection device with a focus servosystem according to the invention.

FIG. 2 shows the principle of the image projection device according to the invention by way of an example of a color television projection device. This device again comprises the three main sections: the illumination system A, the display system B and the projection lens system C in the form of a zoom lens. The principal axis OO' of the illumination system is in alignment with the optical axis DD' of the apparatus which in the embodiment shown is first divided into three sub-axes, which sub-axes are later combined to one optical axis which may coincide with the optical axis EE' of the projection lens system. To obtain an optimum image contrast, the axis EE' may effectively extend at an acute angle to said sub-axes. Effective is understood to mean: apart from possible angles of 90° caused by reflectors, as occur in FIG. 2.

The beam from illumination system A is incident on a color-selective reflector 20, for example a dichroic mirror which reflects, for example the blue color component $b_B$ and passes the rest of the beam. This beam portion meets a second color-selective reflector 21 which reflects the green color component $b_G$ and passes the remaining red color component $b_R$ towards a reflector 22 which reflects the red beam towards the projection lens system. The reflector 22 may be a neutral reflector or a reflector which is optimized for red light. The blue beam is reflected towards a display panel 26 in the form of a liquid crystalline panel by means of a neutral or blue-selective reflector 23. This panel is electronically driven in known manner so that the blue component of the image to be projected appears on this panel. The beam modulated with the blue information reaches the projection lens system C via a color-selective reflector 24, which passes the blue beam and reflects the green beam, and a further color-selective reflector 25 which reflects the blue beam. The green beam $b_G$ traverses a second display panel 27 where it is modulated with the green image component and is then successively reflected towards the projection lens system C by the color-selective reflectors 24 and 25. The red beam $b_R$ traverses a third display panel 28 where it is modulated with the red image component and subsequently reaches the projection lens system C via the reflector 22 and the color-selective reflector 25.

The blue, red and green beams are superimposed at the input of this lens system so that a color image which is magnified by this system on a projection screen not shown in FIG. 2 is produced at this input.

The optical path lengths between the output of the illumination system A and each of the display panels 26, 27 and 28 are preferably equal so that the cross-sections of the beams $b_B$, $b_G$ and $b_R$ are equal at the area of their display panels. Moreover, the optical path lengths between the display panels 26, 27 and 28 and the entrance aperture of the projection lens system are equal so that all the differently colored scenes are satisfactorily focused on the projection screen.

Lenses 40, 41 and 42 may be arranged in front of each one of the display panels 26, 27 and 28, which lenses jointly ensure that all radiation from the exit plane of the illumination system is concentrated in the entrance pupil of the projection lens system C. Such lenses 40, 41, 42 may alternatively be arranged behind the display panels instead of in front of them. It is alternatively possible to have the function of each lens fulfilled by two lenses, one of which is arranged in front of each display panel and the other is arranged behind each display panel.

Figure 28:
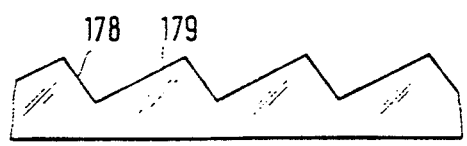

Instead of the transmissive display panels shown in FIG. 2 the image projection device may comprise reflective display panels. This device may be implemented as shown in FIG. 28 of European Patent Application no. 0 467 447.

Instead of a display system having three monochrome panels, the color image projection device may alternatively be provided with a display system having only one display panel, viz. a composite or color panel. This color panel then comprises a number of pixels which is, for example three times as large as the number of pixels of a monochrome panel. The pixels of the color panel are arranged in accordance with three groups with which a red, a green and a blue sub-image is generated. One pixel of each group is associated with a single pixel on the projection screen. For example, a separate color filter is arranged in front of each pixel, which color filter only passes the color desired for the relevant pixel. This color panel may also be a transmissive panel or a reflective panel.

Figure 29:
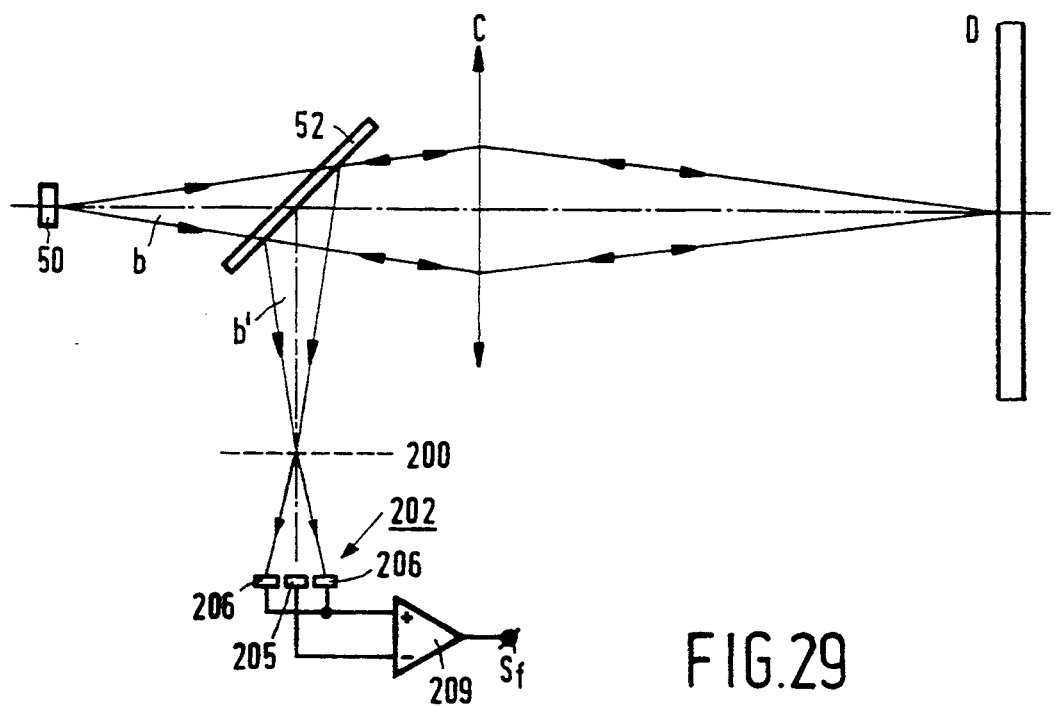

The three chrominance channels of the color image projection device may alternatively be accommodated in separate units each comprising their own illumination system and a display panel. The red, green and blue beams supplied by these units and modulated with image information are combined by, for example dichroic mirrors and subsequently reach the projection lens. Such an embodiment of the image projection device is shown in FIG. 29 of EP Application no. 0 467 447.

The focus servosystem comprises a focus error detection unit FS, an electronic amplifier and control circuit CA and a motor M. The focus detection unit comprises a source 50 which emits invisible radiation, for example a light-emitting diode or a semiconductor laser emitting an infrared radiation beam b. The reflectors 22 and 25 are formed in such a way that they pass this beam. The beam b subsequently traverses the projection lens C and forms a radiation spot (not shown) on the projection screen (not shown). This radiation spot is the image of the source 50 formed by the projection lens. The projection screen reflects a part of the radiation of the beam b towards the projection lens, which lens images the spot formed on the screen on a position-sensitive or composite detector 51 which is arranged in the plane of the source 50 or in a plane conjugated with this plane, for example via a partially transmissive reflector 52. The detector 51 supplies an output signal, or focus error signal, $S_f$ which is dependent on the extent to which the source 50 is sharply imaged on this screen, as will be described hereinafter. Since the plane of the source 50 is the mirror image with respect to the reflector 22, the reflector 25 and the reflectors 24 and 25 of the plane of the display panels 28, 26 and 27, respectively, the signal $S_f$ is also indicative of the extent to which these panels are focused on the screen. If the display panel appears to be defocused on the screen, for example because the screen has been moved towards the optical axis or because the zoom length of the projection lens has been changed, the focusing of the projection lens can be adapted by means of the signal $S_f$ in such a way that a sharp image is again formed on the screen. To this end the signal $S_f$ is applied to the electronic amplifier and control circuit CA which supplies a control signal $S_c$ for the motor M. For example, the focusing group of the projection lens can be moved with respect to the other lens group of the lens by means of this motor.

Figure 3:
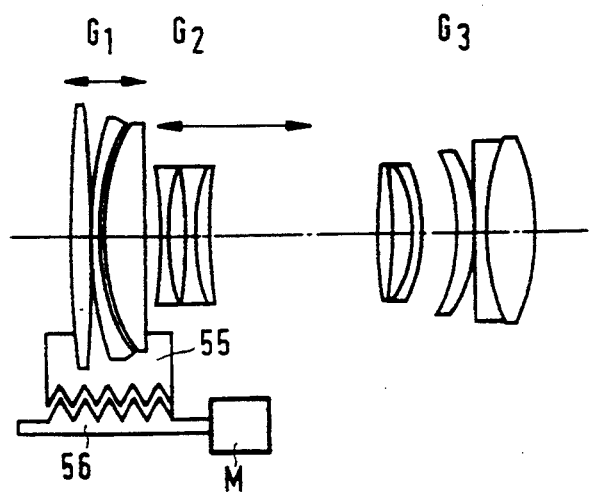
FIG. 3 shows a projection lens system for use in this device.

FIG. 3 shows an embodiment of a projection zoom lens. This lens has three lens groups $G_1$, $G_2$ and $G_3$ each comprising a plurality of lens elements. $G_3$ is the main lens group which supplies the greater part of the lens power. $G_1$ is the focusing lens group, or the front lens group which faces the display system and with which the focus can be set by moving it by means of the motor M and the symbolically shown rack (55) and pinion (56) gearing. A variator group $G_2$ is arranged between the groups $G_1$ and $G_3$. This group may be moved by a further motor (not shown) in the space between the groups $G_1$ and $G_3$ so that the focal length can be adjusted. Such a movement causes a change of the image plane of the projection lens, which change must be compensated for. However, since this change is detected by the focus error detection system, it can be compensated by moving the front group $G_1$. The definition on the projection screen could also be controlled by means of a fourth, movable lens group referred to as compensator group whose movement is coupled to that of the variator group so as to be able to compensate for the change in image plane due to movement of the variator group. Such a fourth lens group renders the projection lens more complex and expensive.

Figure 4:
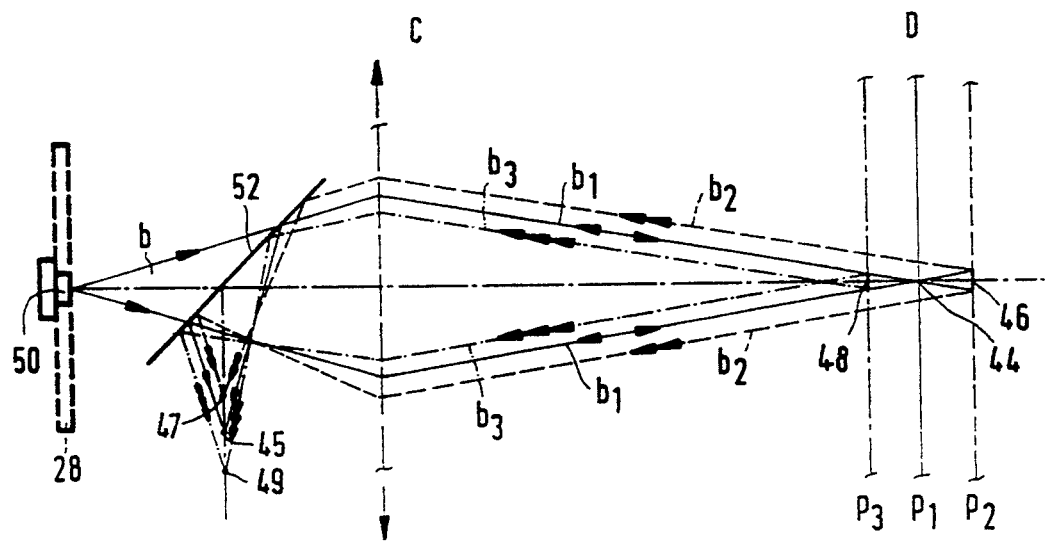

FIG. 4 shows diagrammatically a first embodiment of the focus error detection system. In this Figure and in the following Figures the projection lens C is shown diagrammatically by means of a single lens element denoted by the lens symbol. Moreover, the elements of the image projection device which are not important for the operation of the focus error detection system have been omitted. To elucidate the changes of the paths of the radiation, the distances between the various elements are not shown to scale.

In the system of FIG. 4 the focus measuring beam b supplied by the auxiliary radiation source 50 traverses the projection lens C and is focused in a radiation spot 44 on the screen if the focal length is adapted to the distance between the source 50 and the lens C and to the distance between this lens and the screen D. The beam $b_1$ reflected by the screen again traverses the projection lens C and is subsequently reflected from the path of the beam b by a beam separator 52, for example a partially transmissive mirror. The projection lens focuses the beam $b_1$ in a radiation spot 45 which is a re-image of the source 50. If the screen D is moved from the position $P_1$ to a position $P_2$, the radiation source is no longer sharply focused on the screen D but the beam b is focused in a plane in front of the screen. A larger radiation spot 46 then appears on the screen. The border rays of the beam $b_2$ reflected by the screen are now shifted outwards and this beam is focused in a spot 47 which is shifted upwards with respect to the spot 45. If the screen is moved from position $P_1$ to position $P_3$, the source 50 will be imaged in a plane behind the screen D and a larger radiation spot 48 is formed on the screen again. The border rays of the beam $b_3$ reflected by the screen are now shifted inwards and this beam is focused in a spot 49 which is shifted downwards with respect to the spot 45.

Figure 5:
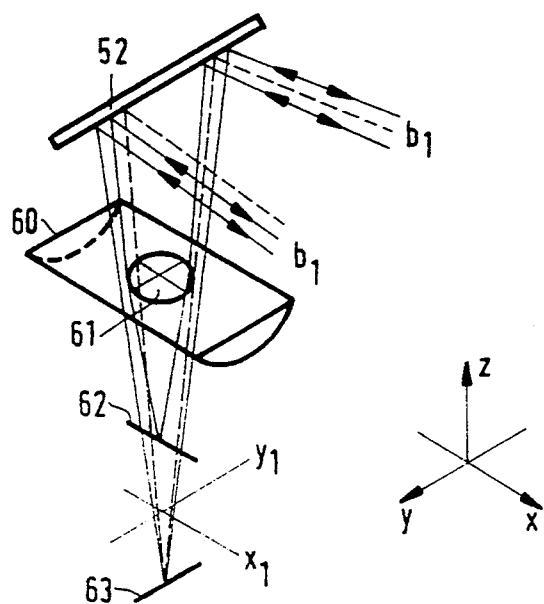

A cylindrical lens or another astigmatic element is arranged in the radiation path behind the beam separator 52. In FIG. 5, which shows the part of the radiation path of the reflected beam $b_1$ behind the beam separator 52, this lens is denoted by 60. The reflected beam $b_1$ forms a round radiation spot 60 on this lens. The cylindrical lens 60 has a given lens power only in the direction Y so that only in this direction the beam $b_1$ is converged to an extra extent. Consequently, the astigmatic system formed by the projection lens C and the cylindrical lens 60 does not image the radiation spot 44 in one circular spot but in two mutually perpendicular astigmatic focal lines 62 and 63. In a plane $X_1Y_1$ halfway between these lines the image of the spot 44 is round. A four-quadrant detector 65 which is shown in a plan view in FIG. 6 is arranged in this plane. This detector has four radiation-sensitive areas 66, 67, 68 and 69 which are separated from each other and the separating strips 70 and 71 extend at angles of 45° to the astigmatic focal lines 62 and 63.

The detector 65 is arranged at such a position on the optical axis that the beam $b_1$ forms a round spot 75 on this detector if the source 50 is sharply imaged on the screen D. Then all detector elements 65, 66, 67 and 68 will receive an equal radiation intensity. The screen is then at the position $P_1$ in FIG. 4. If the screen shifts towards the position $P_2$, the astigmatic focal lines in FIG. 5 shift upwards so that the line 63 will be closer to the detector than the line 62. Then an elliptical radiation spot 76, with the long axis in the Y direction, will be formed on the detector and the detection elements 66 and 69 receive a larger radiation intensity than the detection elements 67 and 68. The reverse is the case if the screen D is at the position $P_3$ in FIG. 4. The astigmatic focal lines in FIG. 5 are then shifted downwards and an elliptical radiation spot 77 with the long axis in the X direction is formed on the detector 65. If the output signals of the detection elements 66, 67, 68 and 69 are represented by $S_{66}$, $S_{67}$, $S_{68}$ and $S_{69}$, the focus error signal $S_f$ will be given by:

$$S_f = (S_{66} + S_{69}) - (S_{67} + S_{68})$$

As is shown diagrammatically in FIG. 6, this signal can be obtained by applying the signals $S_{66}$ and $S_{69}$, and $S_{67}$ and $S_{68}$ to a first and a second summing device 80 and 81, respectively, and by applying the output signals of these summing devices to the inputs of a differential amplifier 82.

For the sake of simplicity it has been assumed in the explanation of the operation of the focus error detection system according to FIGS. 4, 5 and 6 that the projection screen specularly reflects the incident focus measuring radiation, i.e. the reflected radiation is concentrated in a beam $b_1$, $b_2$ or $b_3$ having the same aperture angle as the beam b. However, the projection screen actually behaves as a diffuse reflector which scatters the measuring beam radiation over a larger spatial angle. A part of this reflected radiation enters the projection lens system again and this part, referred to as the reflected focus measuring beam, is concentrated in the detector plane. It is true that a sharp image of the radiation spot 44 is not formed on the detector in that case, but the variation of the intensity distribution in the detector plane upon the occurrence of a focus error is sufficiently large to be able to derive a focus error signal therefrom. The use of a diffusely reflecting screen instead of a specularly reflecting screen only results in the quantity of radiation on the detector being reduced, but does not detract from the principle of the focus error detection system shown in FIGS. 4, 5 and 6. This also applies to the focus error detection systems to be described hereinafter, so that also in the description of these systems the fictions that the projection screen reflects specularly and that the reflected focus measuring beam is focused on the detector can and will be used.

The operation of the astigmatic focus error detection system described above is elucidated by way of example with reference to the displacements of the projection screen D relative to the radiation source 50. Similar phenomena will also occur if the radiation source is moved or if the focal length of the projection lens C changes, for example due to zooming. The focus error detection system (or image defocus detection system) can thus detect whether the image of the radiation source 50 formed by the projection lens on the screen is focused or defocused, irrespective of the cause of the defocusing. Since, as shown in FIG. 2, the display panel 28 is arranged at the same distance from the projection lens as the radiation source, in other words, the radiation source is effectively situated in the plane of the display panel, as is shown by means of solid lines in FIG. 4, the focus error detection system thus also detects whether the display panel is focused or defocused on the projection screen. Consequently, the focal plane of the projection lens can be corrected to obtain a focused image. This also applies to all embodiments to be described hereinafter.

Particularly if the detector 65 is situated at a relatively large distance from the projection lens, it may be advantageous to arrange two cylindrical lenses of different powers and mutually perpendicular cylindrical axes between, the beam separator 52 and the detector in the radiation path of an astigmatic focus error detection system. An improved focus error signal can then be obtained. The effect of the two cylindrical lenses will now be explained with reference to FIGS. 7–10.

FIGS. 7a and 7b show diagrammatically the part of the radiation path behind the beam separator 52 of an astigmatic focus error detection system having one cylindrical lens 60, FIG. 7a being a cross-section taken on the plane ZX in FIG. 5 and FIG. 7b being a cross-section taken on the plane ZY in FIG. 5. The astigmatic focal lines are denoted by 62 and 63 and the detector is denoted by 65. Since the cylindrical lens 60 has lens power in one plane only, the plane in FIG. 7b, the convergence of the beam $b_1$ in FIG. 7a differs from that in FIG. 7b after traversing the lens 60. Consequently, the focus error signal is not linear around zero. The variation of this signal $S_f$ as a function of the defocusing is shown in FIG. 8. The signal not only has a curvature around zero but is also asymmetrical. This is a result of the fact that the images, $P_x$ and $P_y$ in the directions X and Y, of the pupil of the projection lens are not situated symmetrically with respect to the plane of the detector 65. By arranging two cylindrical lenses in a convergent, or divergent beam, a first adjustable parameter is obtained, viz. the position of these lenses with respect to the projection lens. A second adjustable parameter is the power of the two lenses. By suitable choice Of these two parameters it can be achieved that the convergences of the beam $b_1$ in the planes ZX and ZY are equal and that the pupil images are situated symmetrically with respect to the plane of the detector. The signal $S_f$ thus has a linear variation around zero and this signal is not only symmetrical around zero but also further down, as is shown in FIG. 10.

FIGS. 9a and 9b show the same pan of the radiation path in accordance with the same cross-sections as in FIGS. 7a and 7b for an astigmatic focus error detection system having two cylindrical lenses. The two, for example negative, cylindrical lenses are denoted by 90 and 91. In the absence of these lenses the beam $b_1$ would be focused at the point 45 and the image of the pupil of the projection lens would be $P_o$. In the presence of the two lenses 90 and 91 two astigmatic focal lines 92 and 93 are formed. The cylindrical lens 90 images the pupil of the projection lens in a plane $P_x'$ which is situated at a relatively large distance from the plane of the detector 65. The cylindrical lens 91, which has a larger negative power than the cylindrical lens 90, images the pupil of the projection lens in a plane $P_y'$ to the left of the plane of the detector 65 and at the same distance as the plane $P_x'$.

Figure 11:
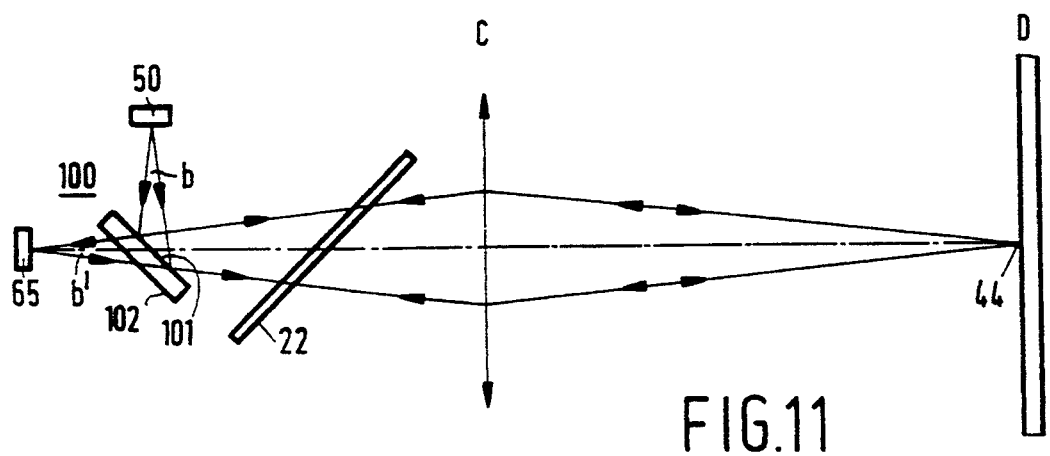

FIG. 11 shows a third embodiment of an astigmatic focus error detection system which can be used in the image projection device of FIG. 2. Instead of a partially transmissive mirror, a plane-parallel plate 100 is used whose front face 101 is, for example 50% reflective. As compared with FIG. 2, the radiation source 50 and the detector 51 have exchanged positions. The axial positions of these elements coincide with the axial position of the display panel (not shown).

A part of the radiation beam b emitted by the source 50 is reflected by the front face 101 of the plate towards the projection lens C and focused by this lens in radiation spot 44 on the screen. The beam b' reflected by the screen passes the projection lens a second time and subsequently traverses the plane-parallel plate 100. Since this plate is placed obliquely in the converging beam b', it has an astigmatic effect so that two astigmatic focal lines are formed again. A detector having the shape of the quadrant detector 65 of FIG. 6 is arranged between these lines, which are not shown in FIG. 11. The advantage of the system in accordance with FIG. 11 is that the functions of separating the projected and the reflected beam and rendering the last-mentioned beam astigmatic are combined in one element.

Figure 12:
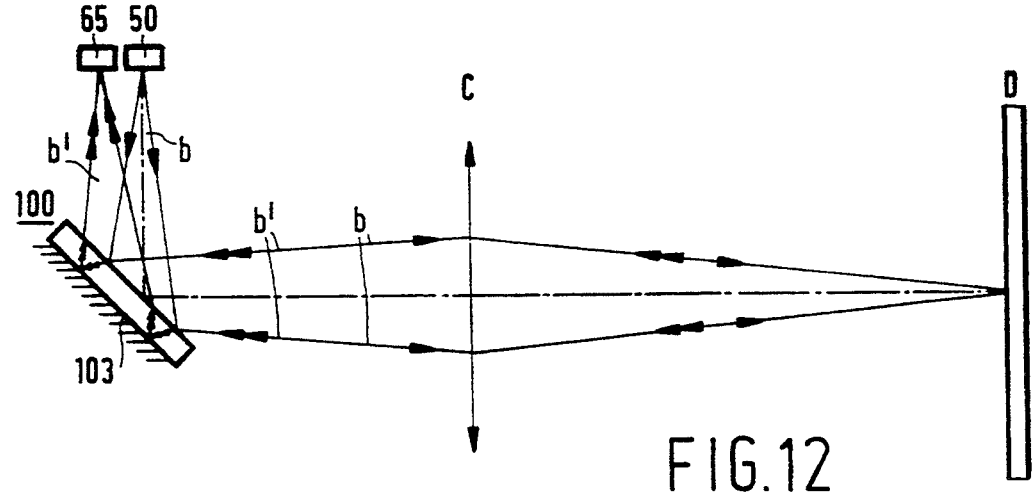

A reflecting layer 103 as is shown in FIG. 12 may be provided on the face 102 of the plane-parallel plate 100. The focus measuring beam then passes the substrate of the plate twice. The embodiment of FIG. 12 is not only less sensitive to tilting of the plate 100, but is also more compact.

Instead of a partially transmissive mirror 101, a combination of a polarization-sensitive reflection layer and a $\lambda/4$ plate may be used. This plate is traversed by the focus measuring beam on its projected as well as its reflected path so that the direction of polarization of the reflected focus measuring beam is rotated 90° with respect to the direction of polarization of the beam emitted by the radiation source, while the first-mentioned beam is substantially completely passed by the polarization-sensitive layer. Apart from the loss of diffusion and other losses in the system, 100% instead of 25% of the source radiation may reach the detector in this way.

Figure 13:
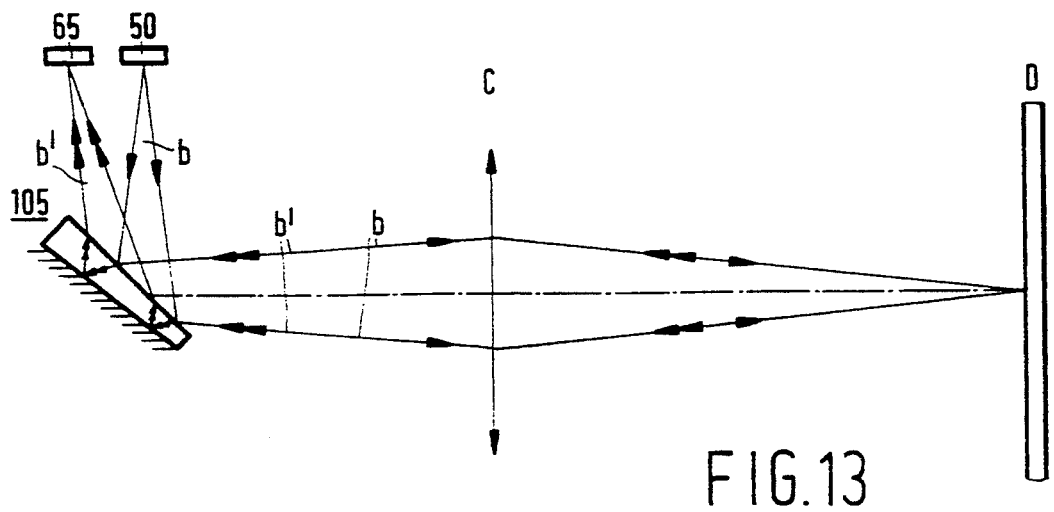

Instead of a plane-parallel plate 100, a wedge-shaped plate 105, as is shown in FIG. 13, may be used in the focus error detection system in, accordance with FIGS. 11 and 12. For obtaining the same extent of astigmatism, the average thickness of a wedge-shaped plate is smaller than that of a plane-parallel plate. By using a wedge, the orientation of the astigmatism can be better adjusted and adapted to the composite detector 65 as compared with the use of a plane-parallel plate.

Figure 14:
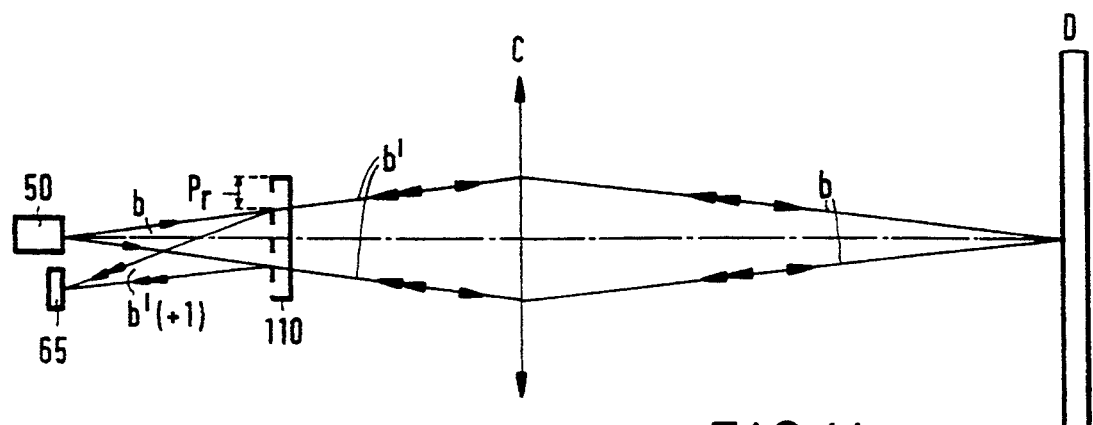

FIG. 14 shows a further embodiment of an astigmatic focus error detection system. The functions of separating the projected and reflected beam, b and b', respectively, and rendering the reflected beam astigmatic can be fulfilled by a single element 110 which comprises a diffraction grating having a linearly varying grating period. As is known, a diffraction grating splits an incident beam into a zero-order sub-beam, two beams diffracted in the plus first and minus first orders and into a plurality of sub-beams diffracted in higher orders. The grating 110 may be formed in such a way that the first-order sub-beam b'(+1) comprises a relatively large part, for example 40%, of the radiation of the reflected beam b'. The quadrant detector 65 is arranged in the path of this sub-beam. Since the grating has a linearly varying grating period $P_r$, it has an astigmatic effect. In fact, a portion of the sub-beam b'(+1) passing through a grating portion having a larger grating period is diffracted through a smaller angle than a beam portion passing through a grating portion having a smaller grating period.

In the embodiments of FIGS. 12, 13 and 14 the planes of the radiation source 50 and of the quadrant detector 65 may be located close together or even coincide and these elements may be arranged on one substrate.

Instead of a diffraction grating having a varying grating period, a grating having a constant grating period and which is easier and cheaper to make may alternatively be used for obtaining an astigmatic beam, provided that the plane of this grating extends at an acute angle to the axis of the beam reflected by the screen. An embodiment in which this is the case is shown diagrammatically in FIG. 15. In this Figure the reference numeral 111 is the oblique grating and the reference numeral 65 denotes a quadrant detector again. In this embodiment use is made of the insight that, if a radiation beam is obliquely incident on a grating having a constant grating period, said grating introduces astigmatism in the sub-beams diffracted in the first or higher orders, which astigmatism is dependent on the angle of incidence $\beta$ of the incident beam. This astigmatism is sufficiently large, also at a relatively small angle $\beta$ of the order of, for example 10–20°, to apply the astigmatic focus error detection method, and to obtain a focus error signal having a sufficiently steep slope around zero.

Figure 15:
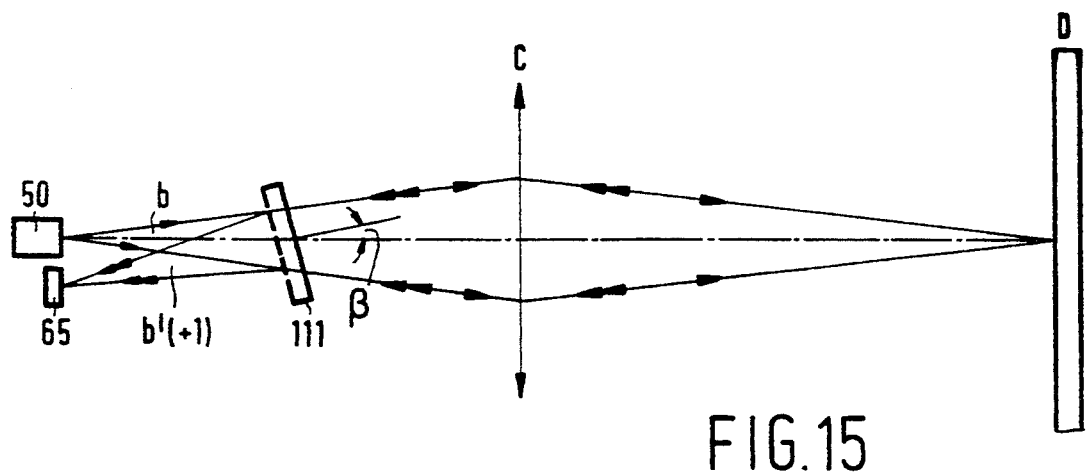
Figure 16:
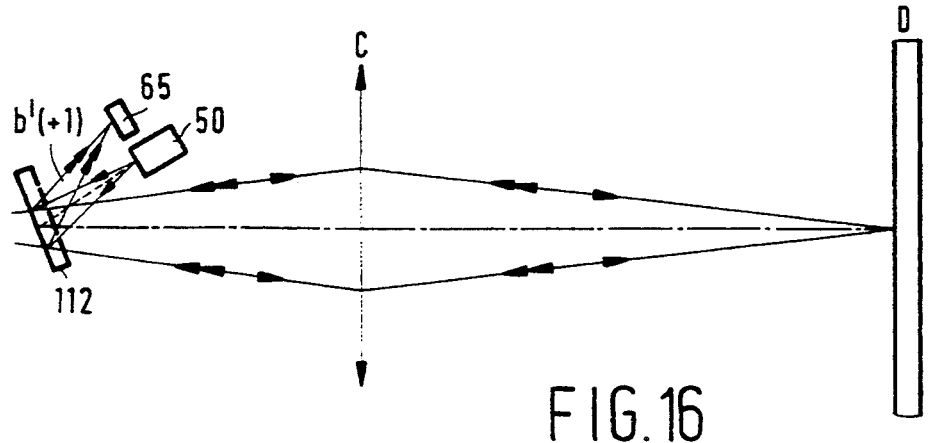

An embodiment of the focus error detection system based on the same principle as that in FIG. 15 is illustrated in FIG. 16. The diffraction grating shown in this Figure is similar to that of FIG. 15, but now it is implemented as a reflecting grating so that the radiation path of the focus measuring beam b is folded. The quadrant detector 65 and the radiation source may be integrated on one substrate again.

Instead of using astigmatic means, a focus error may alternatively be detected by means of an absorbing or beam-splitting element arranged in the path of the reflected focus measuring beam and by means of two or more detectors arranged behind this element. A first embodiment of this principle of focus error detection is shown in FIG. 17.

In this embodiment an absorbing screen 120, also referred to as knife edge is arranged in one beam half of the reflected beam $b_1$ at the position 45 where this beam is focused, if the projected focus measuring beam $b_1$ is focused on the screen. Two detectors 121, 122 each intended for receiving radiation of one beam half are arranged behind this screen. If the screen D is at the position $P_1$, hence at the correct distance from the display panel 28, the reflected focus measuring beam $b_1$ is fictitiously focused in the plane of the knife edge 120. Then the two detectors receive the same quantity of radiation and the focus error signal $S_f$, i.e. the output signal of a differential amplifier 123 whose inputs are connected to the outputs of the detectors, is equal to zero. If the screen D is at the position $P_2$, the reflected focus measuring beam $b_2$ is fictitiously focused at a point 47 in front of the knife edge 120. This knife edge then blocks the radiation which is directed towards the detector 121 and the focus error signal $S_f$ is then positive. If the projection screen is in the position $P_3$, the reflected focus measuring beam $b_3$ is fictitiously focused at the point 49 behind the knife edge 120. This knife edge then blocks the radiation directed towards the detector 122 so that this detector receives less radiation than the detector 121. The focus error signal $S_f$ is then negative. The magnitude and direction of a deviation in the distance between the projection screen D and the display panel 28 can then be determined.

Figure 17:
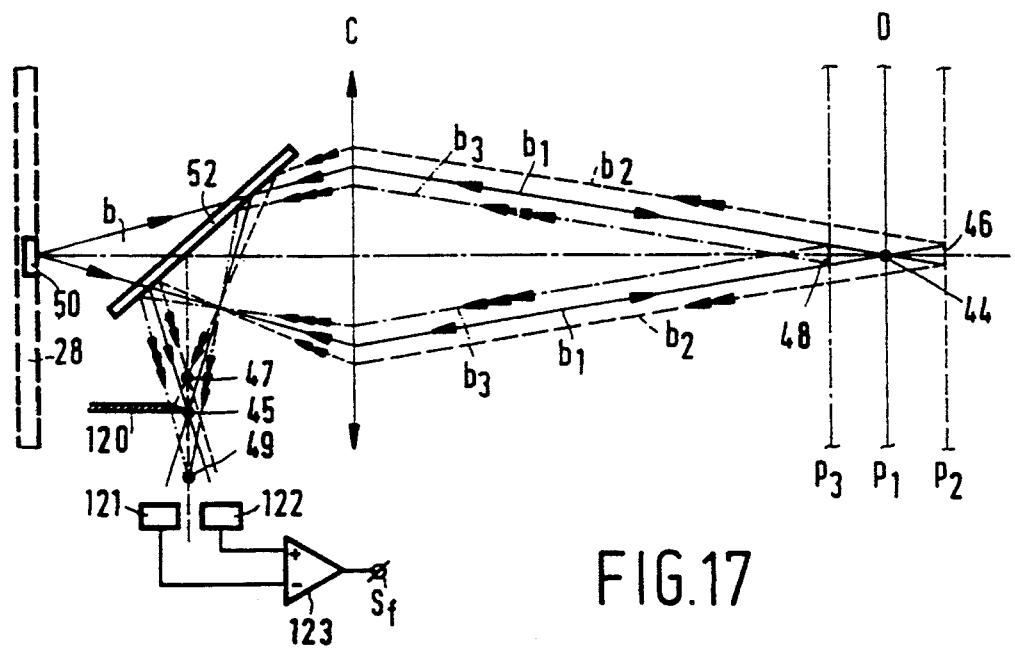
FIGS. 17 to 28 show the principle and different embodiments of a focus error detection system to be used in this device, which system is based on the single or double Foucault focus detection principle.
Figure 18:
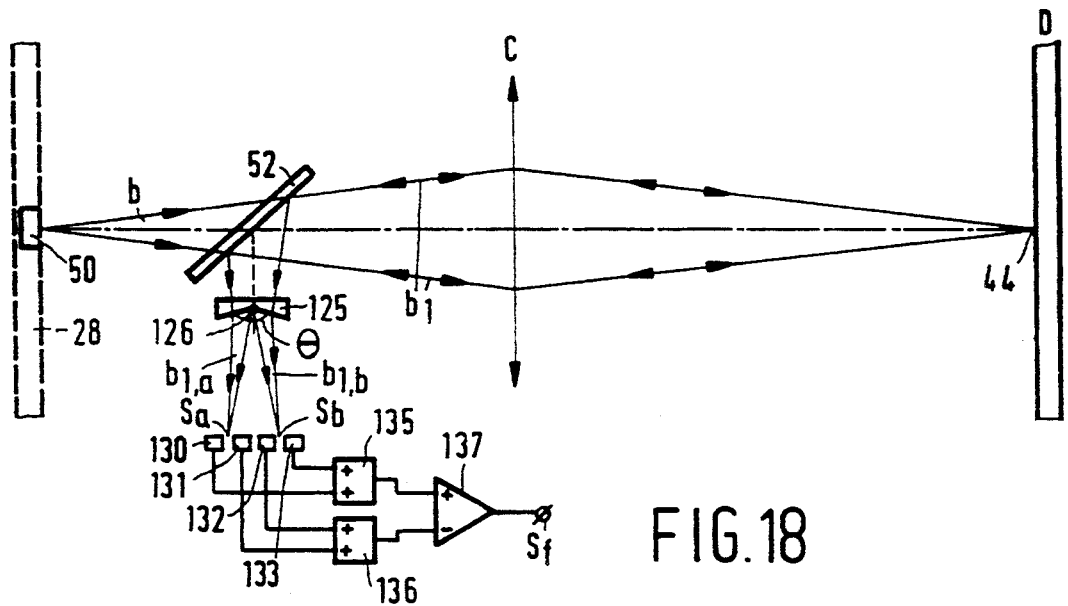

FIG. 18 shows a focus error detection device based on the same principle as that of FIG. 17. However, instead of an absorbing screen in one of the beam halves, a transparent wedge-shaped prism 125 is used whose rib 126 is located on the chief ray of the reflected focus measuring beam $b_1$. As compared with the device of FIG. 17, the device of FIG. 18 has the advantage that the wedge-shaped prism need not be positioned as accurately, both in the axial direction and in the direction perpendicular thereto, as the knife edge 120. The wedge-shaped prism 125 in FIG. 18 splits the beam into two sub-beams $b_{1,a}$ and $b_{1,b}$. Each of these sub-beams forms a radiation spot $S_a$ and $S_b$ on an associated pair of detectors 130, 131 and 132, 133, respectively. These detectors are situated in the plane in which the reflected focus measuring beam is fictitiously focused in the absence of the prism 125. If the beam b is sharply focused on the plane of the projection screen, the radiation spots $S_a$ and $S_b$ are located symmetrically with respect to their associated detector pairs 130, 131 and 132, 133, respectively. If a focus error occurs, each of these spots will become asymmetrically larger so that the center of the radiation distribution of each spot is located asymmetrically with respect to the associated detector pair. This can also be considered as a displacement of the radiation spot with respect to the associated detector pair, which displacement varies for one radiation spot in a direction opposite to that of the other radiation spot. If the screen D moves to the left, the focus of the reflected focus measuring beam moves away from the refractive rib 126 of the prism and the radiation spots $S_a$ and $S_b$ move inwards. The detectors 131 and 132 then receive more radiation than the detectors 130 and 133. If the screen D moves to the fight, the reverse effect occurs and the detectors 131 and 132 receive less radiation than the detectors 130 and 133. The focus error signal $S_f$ is obtained by applying, for example the signals of the detectors 130 and 133 to a first summing device 135 and those of the detectors 131 and 132 to a second summing device 136 and by applying the output signals of these summing devices to a differential amplifier 137, and as is shown in FIG. 18.

The focus error detection system may alternatively be adapted in such a way that instead of the detectors 130–133 the refractive rib 126 of the prism is located in the plane where the reflected measuring beam $b_1$ is fictitiously focused at a correct focusing of the beam b on the screen.

It is possible to use three detectors instead of four. The detectors 131 and 132 are then replaced by one central detector and the focus error signal is obtained by subtracting the sum of the output signals of the detectors 130 and 133 from the output signal of the central detector.

The beam-splitting prism 125 may be made of glass or of another transparent material of satisfactory optical quality. The angle Θ between the oblique sides of the prism should preferably be chosen as close as possible to 180° in order that the detectors will be situated as close together as possible and can be integrated on one substrate. In practice, the prism 125 will be relatively small.

Figure 19:
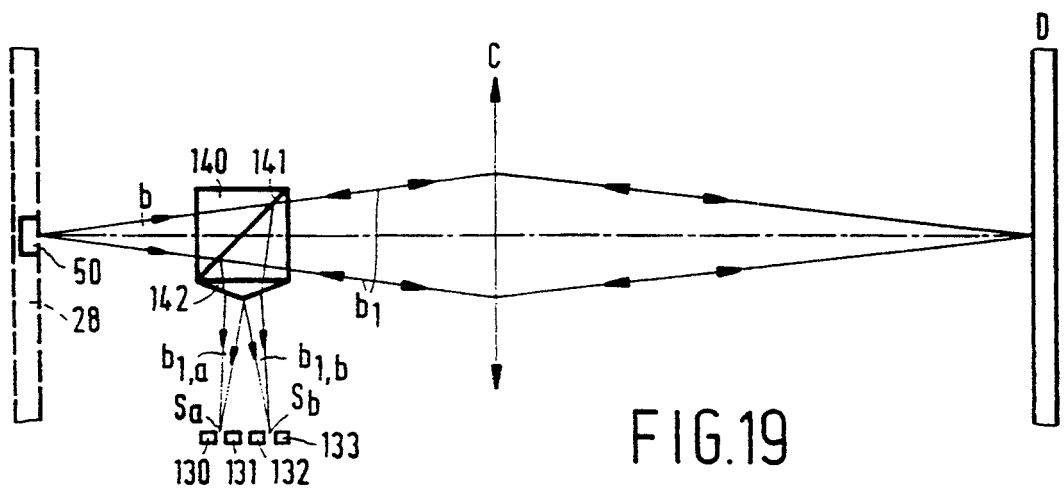

The alternative shown in FIG. 19 is preferably used instead of the separate elements 52 and 125. The beam-splitting prism 142 is now arranged on a beam-separating prism 140 having a partially transparent layer 141 and can be made easily. The prism 142 may be made of a cured synthetic material, for example a material curing under the influence of ultraviolet radiation or heat. The prism may be made by applying said material, for example polymethyl methacrylate (PMMA) or polycarbonate (PC) in a sufficiently viscous state on the prism 140, by shaping the material by means of a mould which is correctly aligned with respect to the prism 141 and by subsequently curing it. After the mould has been removed and without further operations, the prism assembly 141, 142 is ready to be built in.

Figure 20:
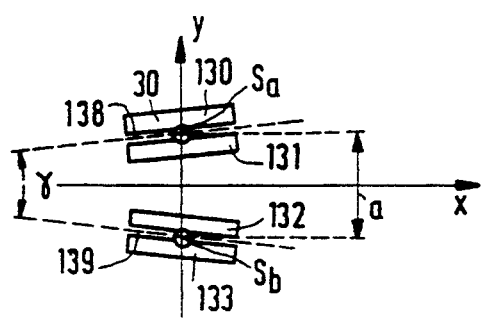

When assembling the focus error detection system as shown in FIGS. 18 and 19, it should be ensured that the distance between the two radiation spots $S_a$ and $S_b$, which distance is dependent on the apex angle Θ of the beam-splitting prism, is equal to the distance between the separating strip of the detectors 130 and 131 on the one hand and the separating strip of the detectors 132 and 133 on the other hand, so that the centers of the radiation spots are located on the associated separating strips when the beam b is satisfactorily focused on the projection screen D. To facilitate adjustment during assembly, the detection system may be implemented as is shown in FIG. 20. Now, the detector pairs 130, 131 and 132, 133 are no longer positioned parallel to each other, but in such a way that the separating strip 138 between the detectors 130 and 131 extends at an angle γ to the separating strip 139 between the detectors 132 and 133. FIG. 20 shows the situation in which the centers of the radiation spots $S_a$ and $S_b$ are located at a distance d from each other, which distance is equal to the distance between the separating strips measured along the Y axis through the center of the detection system. If the distance between the radiation spots $S_a$ and $S_b$ is larger than d, the sub-beams $b_1$ and $b_2$ should be shifted with respect to the detection system in such a way that the radiation spots $S_a$ and $S_b$ will move to the right until their centers are exactly located on the associated separating strips. If the distance between the radiation spots is too small, these spots must be moved to the left with respect to the detectors. The desired displacement of the radiation spots can be realised by displacing or tilting the beam-splitting prism. The detection system instead of the radiation spots may alternatively be shifted so as to obtain the desired adjustment.

The beam-splitting prism 125 in the focus error detection system of FIG. 18 is preferably made of a transparent synthetic material because this material is inexpensive and because the prism can then be manufactured at low cost in large numbers by means of replica techniques. Such a prism is, however, sensitive to variations of the ambient parameters such as temperature. A temperature variation may bring about a variation of the refractive index and the shape of the prism so that the sub-beams $b_{1,a}$ and $b_{1,b}$ and hence the radiation spots $S_a$ and $S_b$ formed by these beams are shifted with respect to the detection system. This shift occurs in the same direction as the shift caused by a focus error. The shift due to temperature variations is then interpreted as a focus error so that an offset, or a zero deviation, is produced in the focus error signal.

Figure 21:
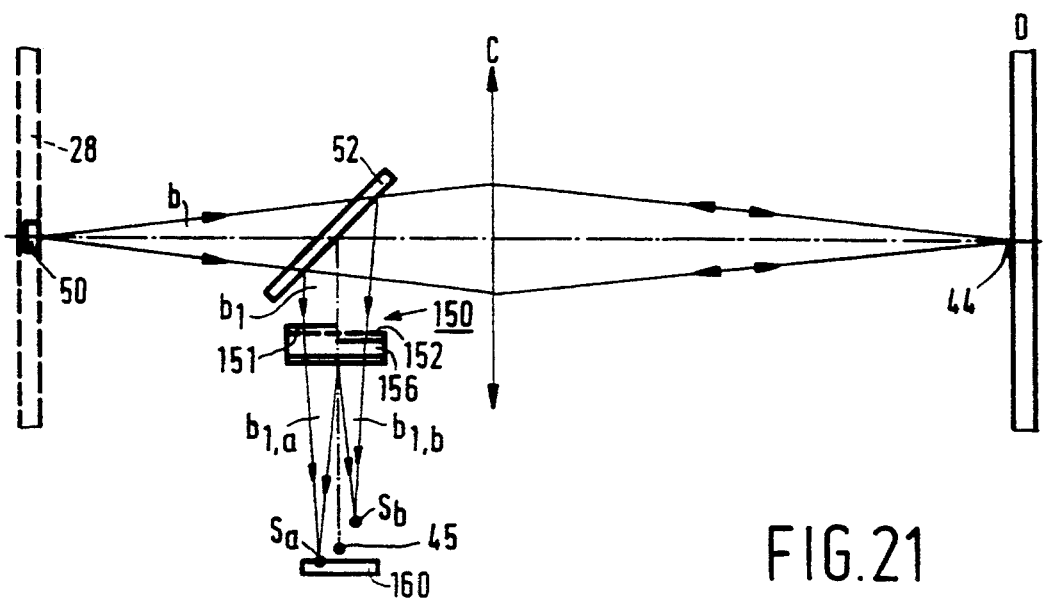
Figure 22:
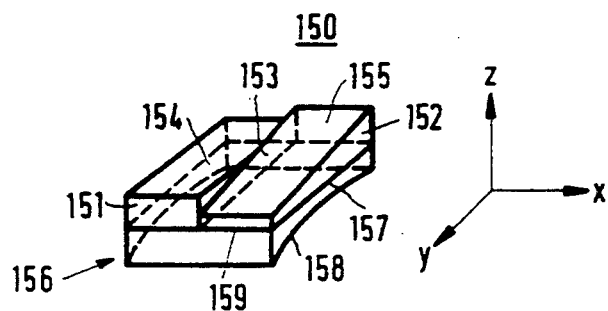

The occurrence of such an offset is prevented in a focus error detection system in which a composite wedge is used as a beam splitter. FIG. 21 shows such a focus error detection system, while FIG. 22 shows an embodiment of the composite wedge 150 in a perspective view and on a larger scale. This wedge comprises two wedge portions 151 and 152 whose upper faces 154 and 155 have opposite slopes with respect to the common base face 159. It is alternatively possible that one of the upper faces is parallel to the base face and that the other upper face has a slope with respect to the base face. The face 153 is the interface between the two wedge portions. The chief ray of the focus measuring beam, illustrated by means of a dot-and-dash line in FIG. 21, is situated in this interface. The composite wedge splits the reflected focus measuring beam $b_1$ into two sub-beams $b_{1,a}$ and $b_{1,b}$ which are displaced in opposite directions due to the opposite slopes of the two wedge portions. The sub-beam $b_{1,a}$ is focused in the radiation spot $S_a$ which is located, for example in front of the plane of the drawing in FIG. 21. The sub-beam $b_{1,b}$ is focused in the radiation spot $S_b$ which is located behind the plane of the drawing in FIG. 21. In the absence of the composite wedge the beam $b_1$ would be focused in the radiation spot 45. For the sake of clarity the detection system 160 is shown below the radiation spots $S_a$ and $S_b$. This system is actually located in the plane of the radiation spots $S_a$ and $S_b$ and perpendicular to the chief ray of the beam $b_1$.

Figure 23:
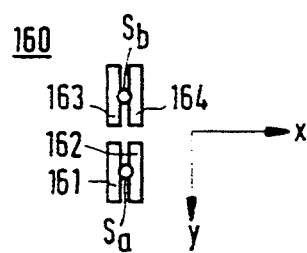

The detection system 160 comprises two detector pairs one of which is located, for example in front of the plane of the drawing in FIG. 21 and the other is located behind this plane. FIG. 23 is a plan view of the detection system with the detector pairs 161, 162 and 163, 164. If the beam b is correctly focused on the projection screen D, the radiation spots $S_a$ and $S_b$ are minimal and located symmetrically with respect to the associated detector pair 161, 162 and 163, 164, respectively. When a focus error occurs, each radiation spot becomes asymmetrical, i.e. the center of the radiation distribution of the spot shifts with respect to the associated detector pair. This shift is in the opposite direction again for the two radiation spots. If the output signals of the detectors are represented by $S_{161}$, $S_{162}$, $S_{163}$ and $S_{164}$, the focus error signal $S_f$ will be given by:

$$S_f = (S_{161} + S_{164}) - (S_{162} + S_{163})$$

Instead of this focus error signal, a normalized focus error signal may be derived. This signal $S_{fn}$ is given by $$S_{fn} = \frac{S_{161} - S_{162}}{S_{161} + S_{162}} - \frac{S_{163} - S_{164}}{S_{163} + S_{164}}$$

This signal is not influenced by variations of the total quantity of radiation on the detection system, which variations may occur as a result of a variation of the intensity of the radiation emitted by the laser or by contamination of the optical elements and is only determined by the intensity distribution over the detectors. Such a normalized focus error signal may also be derived in the focus error detection systems shown in FIGS. 17, 18, 19 and 20.

A cylindrical lens is preferably arranged in the radiation path behind the partially transmissive mirror 52. Since the mirror 52 is a plane-parallel plate which is arranged obliquely in the focus measuring beam, it will introduce astigmatism in this beam. A cylindrical lens is also an astigmatic element. By suitable choice of the relevant lens parameters such as the radius of curvature of the curved lens surface, the cylindrical lens can correct the astigmatism introduced by the mirror 52. In FIGS. 21 and 22 the cylindrical lens is denoted by the reference numeral 156. This lens may have a flat surface 157 and a curved surface 158. The cylindrical axis of the lens is perpendicular to the optical axis of the device and, in the embodiment shown in which the cylindrical lens is a negative lens, it is parallel to the plane of the drawing in FIG. 21.

The cylindrical lens 156 and the wedge 150 may be separate elements and made of different materials. However, these elements are preferably made of the same materials and integrated to one element. Then the wedge 150 need not be arranged on a separate support and, what is more important, the elements can be jointly manufactured so that they are automatically aligned correctly with respect to each other. The integrated element may be a transparent synthetic material such as polymethyl methacrylate (PMMA) or polycarbonate (PC) and may be manufactured at low cost by using known replica techniques and moulds.

The optical behaviour of the composite wedge 150 and the cylindrical lens manufactured of such a synthetic material is temperature-dependent, but since in the arrangement shown the change of the refractive index of the material or of the shape of the elements due to temperature variations may result in a displacement of the radiation spots $S_a$ and $S_b$ along the separating strips of the detector pairs 161, 162 and 163, 164, these changes will not affect the focus error signal.

The composite wedge and the cylindrical lens may alternatively be circular instead of rectangular as is shown in FIGS. 21 and 22.

Figure 24:
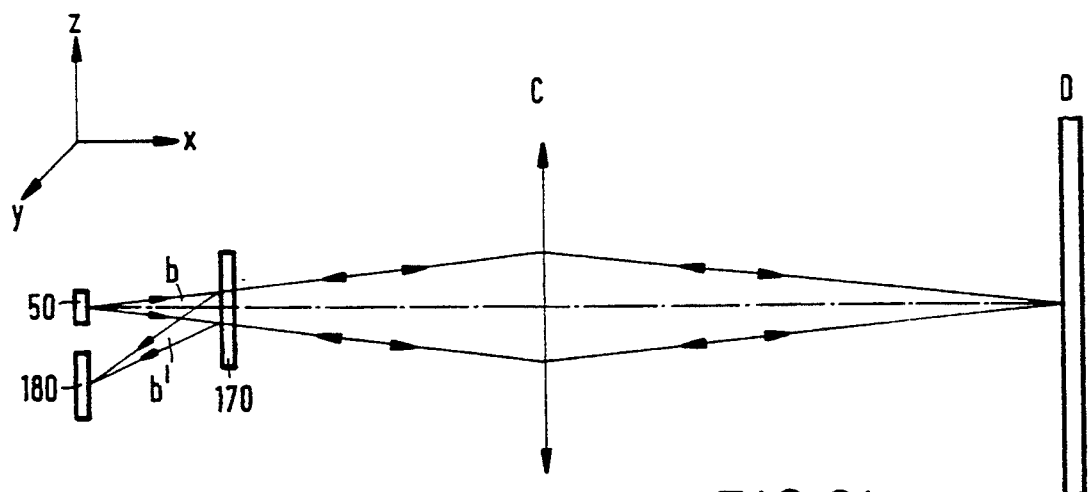

A particularly advantageous embodiment of the focus error detection system operating with sub-beams is the embodiment in which the functions of beam separation and beam splitting are performed by one element, viz. a diffraction grating. In FIG. 24, which shows an embodiment of such a system, this grating is denoted by the reference numeral 170. The radiation diffracted in, for example the +1st order by this grating is incident on the detection system 180. The grating parameters, particularly the quotient of the width of the grating strips and the width of the intermediate strips and the depth and shape of the grating grooves are chosen to be such that a maximum quantity of radiation is incident on the detection system.

Figure 25:
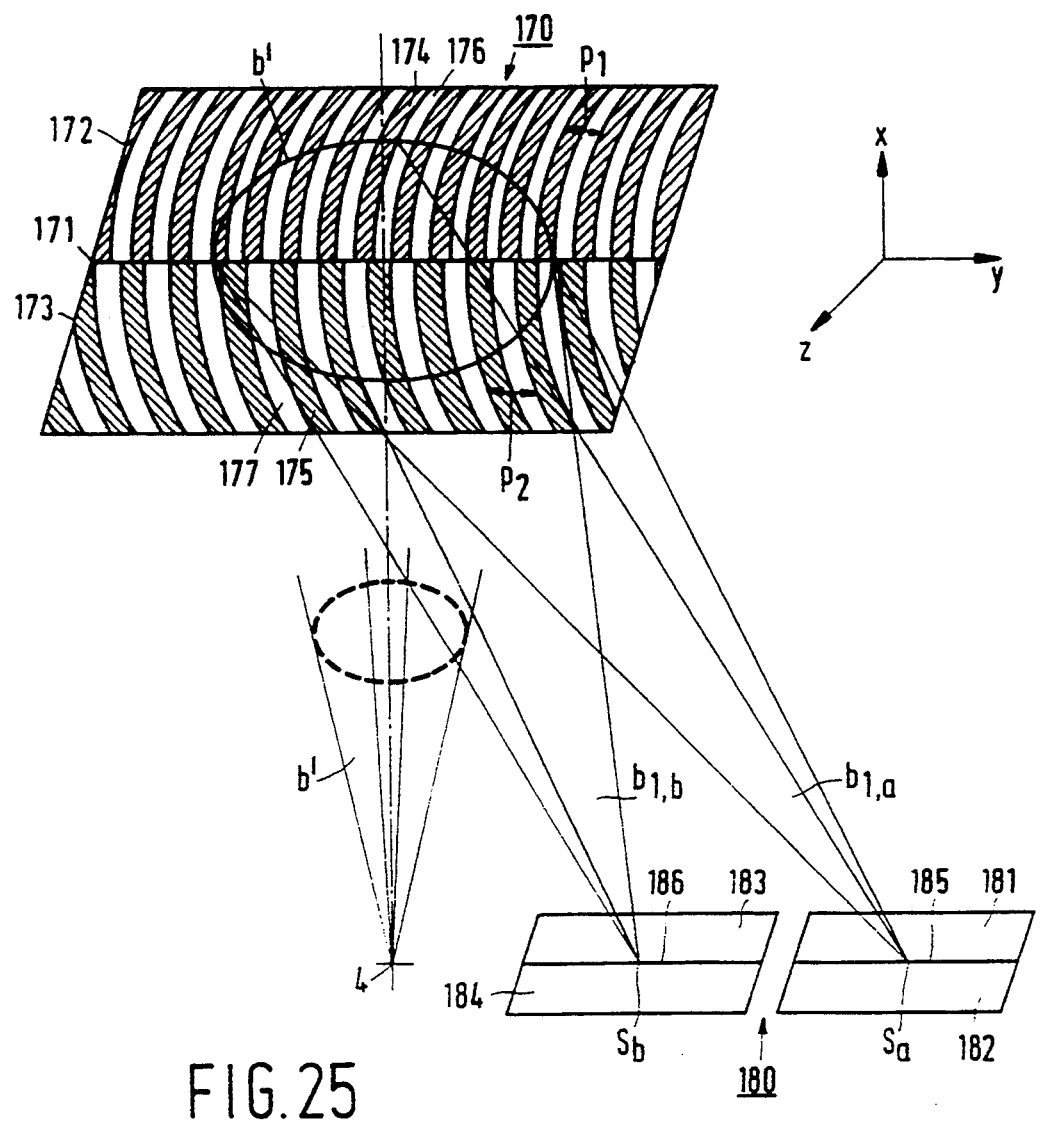

FIG. 25 shows in a perspective view a first embodiment of the grating 170 and the associated detection system 180. The reflected focus measuring beam b' is indicated by its cross-section in the plane of the grating 170. The grating has two subgratings 172 and 173 which are separated from each other by the line 171. The grating strips of the gratings 172 and 173 are denoted by the reference numerals 174 and 175, respectively. These grating strips alternate with intermediate strips 176 and 177. At the area of the separating line 171 the grating strips of the sub-grating 172 have the same direction as those of the sub-grating 173 in this embodiment. The grating strip direction is, for example perpendicular to the separating line 171. The average grating period $P_1$ of the sub-grating 172 differs, however, from the average grating period $P_2$ of the subgrating 173. Consequently, the angle at which the sub-beam $b_{1,a}$ is diffracted is different from the angle at which the sub-beam $b_{1,b}$ is diffracted. This means that, in the plane of the detectors, the radiation spots $S_a$ and $S_b$ are offset with respect to each other in the Y direction. Two radiation-sensitive detectors 181, 182 and 183, 184 which are separated by narrow strips 185 and 186 are associated with each sub-beam $b_{1,a}$, $b_{1,b}$. These detectors, for example photodiodes, are arranged in such a way that the radiation spots $S_a$ and $S_b$ are located symmetrically with respect to the detectors 181, 182 and 183, 184, respectively, if the beam b is correctly focused on the projection screen. When a focus error occurs, the radiation spots become asymmetrically larger. If the output signals of the detectors 181, 182, 183 and 184 are represented by $S_{181}$, $S_{182}$, $S_{183}$ and $S_{184}$, the focus error signal $S_f$ will be given by:

$$S_f = (S_{181} + S_{184}) - (S_{182} + S_{183})$$

Figure 26:
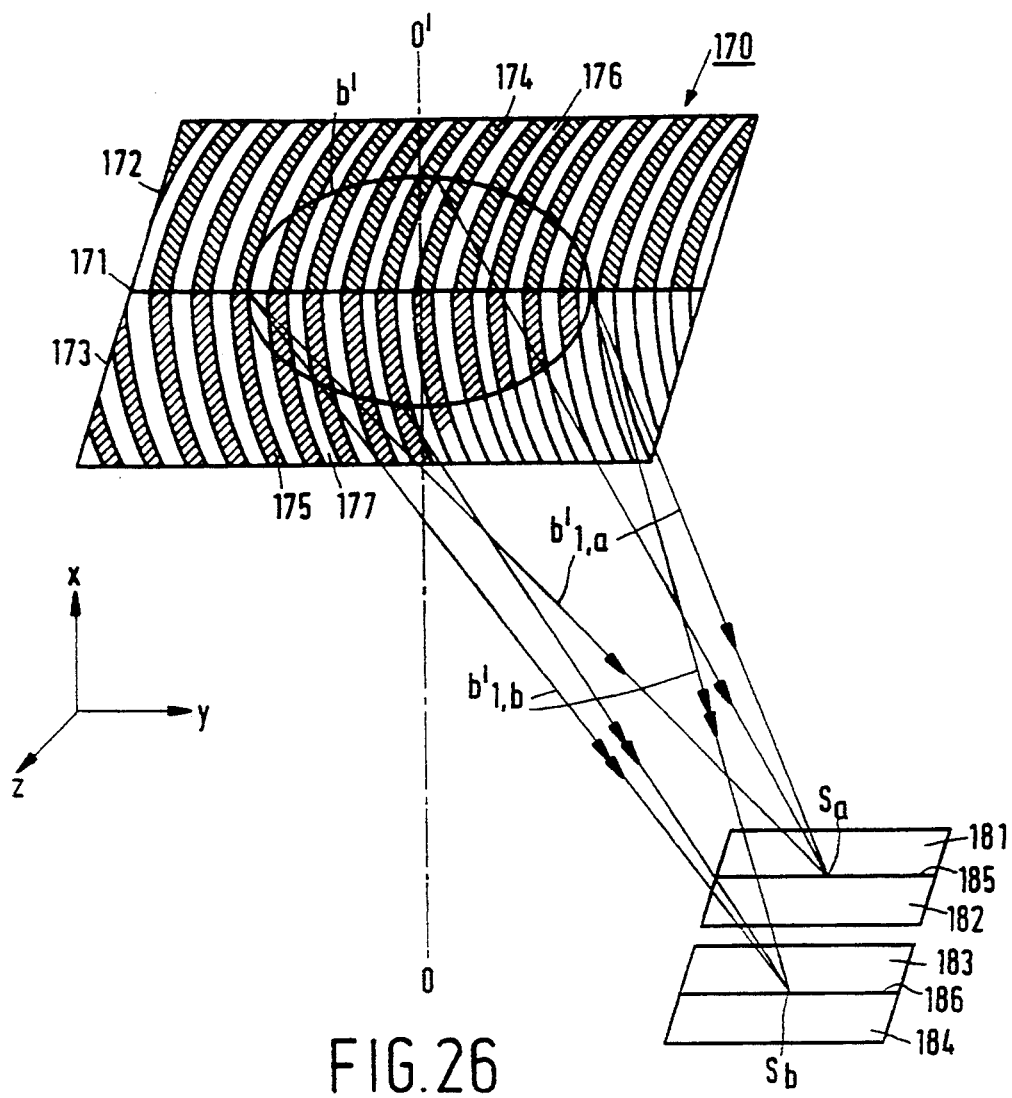

FIG. 26 shows a second embodiment of the grating 170 and the associated system of detectors. The sub-gratings 172 and 173 now have the same average grating period. The direction of the grating strips 174 of the sub-grating 172 now extends at a first angle to the separating line 171, while the direction of the grating strips 175 of the sub-grating 173 extend at a second, preferably equally large but opposite angle to the separating line. The sub-beams $b_{1,a}$ and $b_{1,b}$ are substantially diffracted in a direction perpendicular to the direction of the grating strips so that the detectors 181–184 are arranged in a different way than in FIG. 25. The separating strips 185 and 186 are now located one behind the other in the Z direction. The focus error signal is again given by:

$$S_f = (S_{181} + S_{184}) - (S_{182} + S_{183})$$

The focus error detection systems in accordance with FIGS. 25 and 26 may be adapted in such a way that the detectors in the form of photodiodes are located close to the radiation source, for example in the form of a diode laser and can be integrated on one substrate with the radiation source so that the system will become simpler and more stable.

Since the sub-gratings 172 and 173 in FIG. 26 have the same grating period and thus diffract the sub-beams $b_{1,a}$ and $b_{1,b}$ through the same angles so that the sub-beams are fictitiously focused in the same plane, the embodiment in accordance with this Figure is preferred to that shown in FIG. 25 in which the sub-gratings have different grating periods.

The gratings in the embodiments shown in FIGS. 25 and 26 may be straight grating strips and have a constant grating period. However, the sub-gratings preferably have a varying grating period, in which the variation is, for example of the order of several percents of the average grating period. Moreover, the grating strips are preferably curved, as is shown in FIGS. 25 and 26. Then the sub-gratings have a varying lens action. Due to the varying grating period the positions in the X direction of the radiation spots $S_a$ and $S_b$ can be varied by displacing the grating 170 in the direction of the separating line 171, i.e. in the Y direction. Aberrations in a direction perpendicular to the line 171 can be minimized by adapting the curvatures of the grating strips. The possibility of adapting the X positions of the radiation spots $S_a$ and $S_b$ is particularly important if an integrated radiation source-photodiode unit is used, i.e. one component in which the radiation source and the photodiodes are arranged on one substrate and are thereby fixed with respect to each other and thus have a fixed mutual distance in the X direction. This distance is subject to manufacturing tolerances and cannot be corrected during assembly of the focus error detection system by displacing the photodiodes with respect to the radiation source in the X direction.

The distance in the Y direction between the radiation source and the center of the detection system 180 is also subject to manufacturing tolerances. This may also be compensated by displacing the grating 170 in the direction of the separating line 171.

In the embodiment of FIG. 25 it can be ensured that, in spite of the different angles at Which the sub-beams $b_{1,a}$ and $b_{1,b}$ are diffracted in the XY plane as a result of the different average grating periods of the sub-gratings 172 and 173, the fictitious foci of the sub-beams $b_{1,a}$ and $b_{1,b}$ are nevertheless located in one YZ plane, viz. by giving the grating periods and the curvatures of the grating strips of corresponding parts of the two sub-gratings a different variation.

An important advantage of the diffraction grating having curved grating strips as compared with a grating having straight grating strips is that optical aberrations, such as coma and astigmatism, which may occur when the last-mentioned grating is used can be avoided by taking these aberrations into account in the manufacture of this grating and by adapting the curvature of the grating strips thereto.

Figure 27:
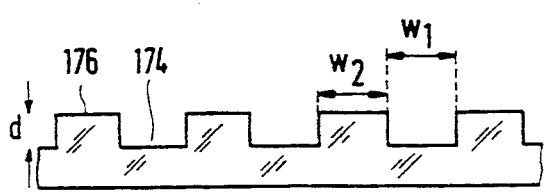

The diffraction grating is preferably a phase grating in the form of a relief structure in which the grating grooves are located at a different height than the intermediate strips. The principle of such a grating is shown in FIG. 27. This grating can be optimized by suitable choice of the ratio between the width $W_1$ of the grating grooves 174 and the width $W_2$ of the intermediate strips and of the depth d of the grating grooves. Moreover, the shape of the grooves can be adapted. Instead of the rectangular symmetrical shape of FIG. 27, an asymmetrical shape is preferably used, for example a sawtooth shape having rising edges 179 and falling edges 178 as is shown in FIG. 28 because a maximum quantity of radiation can thereby be concentrated in one order, for example the +1 order.

Figure 30:
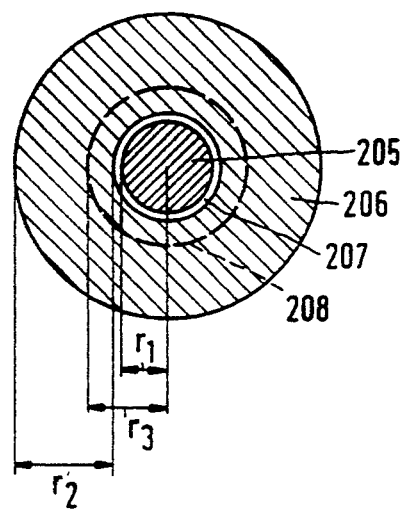

FIG. 29 shows a first embodiment of a focus error detection signal in which the fact is utilized that a focus error results in a variation of the vergence of the focus measuring beam which has been reflected by the projection screen and has passed the projection lens a second time. In this embodiment a rotationally symmetrical detection system 202 is arranged behind the beam separator 52 in a plane at some distance from the plane 200 in which the reflected measuring beam b' is fictitiously focused when the beam b is focused on the projection screen D. The detection system is shown in a plan view in FIG. 30 and has a central, round detector 205, centered on the optical axis, having a radius $r_1$ and a surrounding annular detector 206 having a width $r_2$. The detectors are separated from each other by a narrow annular strip 207. The cross-section of the beam b' at the area of the detector system is indicated by means of the solid-line circle 208. The radii of the detectors and the position of the detection system along the optical axis are chosen to be such that, if the focus measuring beam b is sharply focused on the screen D, the radius $r_3$ of the cross-section of the reflected beam b' in the plane of the detection system has such a value that the quotient of the illuminated surfaces of the detectors 205 and 206 has a given value, preferably 1. In this preferred case the output signals of the detectors 206 and 207 are equal so that the focus error signal $S_f$, which is supplied by a differential amplifier 209 whose inputs receive the detector signals, is equal to zero.

If the distance between the source 50 and the projection screen D increases, for example because the screen moves to the right, the cross-section 208 of the beam b' will increase and the detector 206 will have a larger radiation intensity than the detector 205. The focus error signal $S_f$ is then positive. If the distance between the source 50 and the projection screen becomes smaller than in FIG. 29, the cross-section 208 of the beam b' will decrease and the detector 205 receives more radiation intensity than the detector 206 and the focus error signal is negative. Thus, the value and sign of the signal $S_f$ represent the magnitude and direction of a focus error.

Figure 31:
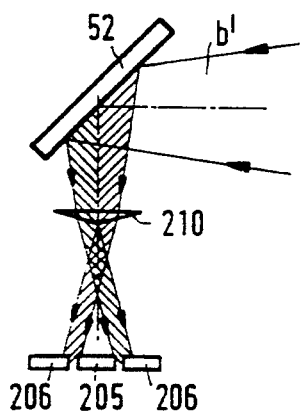

FIG. 31 shows a second embodiment of the focus error detection system in which use is made of the variation of the vergence of the reflected beam upon defocusing. This Figure only shows the radiation path of the reflected focus measuring beam behind the beam separator 52. This radiation path includes a conical element 210 having a round cross-section. Together with the projection lens system, this element ensures that the beam b' has an annular cross-section in the plane of the detectors 205 and 206. In FIGS. 32a, 32b and 32c the annular radiation spot is illustrated by means of the solid-line circles 215 and 216 which indicate the inner circumference and the outer circumference of the spot. The outer radius of the central detector 205 and the inner radius of the outer detector 206 are adapted to the beam b' in such a way that the two detectors receive an equal quantity of radiation when the beam b is correctly focused on the screen D, as is shown in FIG. 32a. If the beam b is focused in a plane in front of the screen D, the annular spot in the plane of the detectors will decrease and the central detector 205 receives more radiation than the outer detector 206, as is shown in FIG. 32b. The reverse situation, illustrated in FIG. 32c, is the case if the beam b is focused in a plane behind the screen D. The focus error signal is obtained by subtracting the output signals of the detectors 205 and 206 from each other, analogously as in FIG. 29.

A third embodiment of the focus error detection system which is based on the principle of FIGS. 29–32 is shown in FIG. 33. In this embodiment the radiation path behind the beam separator 52 consecutively includes a beam splitter 220, which reflects half the beam b' as beam $b'_a$ towards a first detector 222, and a reflector 221 which reflects the other half of the beam $b'_b$ towards a second reflector 223. Diaphragms 224 and 225 having the same apertures are arranged in front of the detectors 222 and 223. The beam $b'_a$ is focused in a plane behind the diaphragm 224, while the beam $b'_b$ is focused in a plane in front of the diaphragm 225. The positions of these planes and hence the radiation quantities passed through apertures of the coplanar diaphragms 224 and 225 towards the detectors 222 and 223 are determined by the extent of focusing of the focus measuring beam b on the projection screen D. It may again be ensured that the detectors 222 and 223 receive the same quantity of radiation if the focus measuring beam is sharply focused on the projection screen D. When a focus error occurs, one of the detectors receives a larger or smaller quantity of radiation than the other detector, dependent on the magnitude and direction of the error. The focus error signal $S_f$ is obtained again by subtracting the output signals of the detectors 222 and 223 from each other by means of a differential amplifier 209.

FIG. 34 shows the principle of a further class of focus error detection systems. In these systems use is made of a narrow focus measuring beam which traverses the projection lens system C eccentrically. This beam is supplied, for example by a radiation source 50 which is arranged next to the display panel 28. The projection lens system C forms an image 28' of the display panel on the projection screen D and, of the radiation source 50, an image 44 next to the image 28'. Only the chief ray $b_p$ and the beginning and end of the border rays $b_{b,1}$ and $b_{b,2}$ of the beam b emitted by the source 50 and forming the image 44 are shown.

Radiation specularly reflected by the projection screen forms a beam with a chief ray $r_{p,1}$, which beam no longer traverses the projection lens system C. However, a considerable part of the radiation beam b is diffusely reflected, as is illustrated by means of the short arrows from the point 44. A part of the diffusely reflected radiation is received by the projection lens system C. This radiation part forms a beam whose chief ray is denoted by $b_p'$. The system is adapted in such a way that the image 45 formed by means of the beam of which $b_p'$ is the chief ray and by means of the projection lens system coincides with the radiation source 50 if, as is shown in FIG. 34, the distance between the display panel 28 and the projection screen is correct, i.e. if the focus measuring beam b is sharply focused on the projection screen. If the projection screen D is shifted towards the position $P_2$, the re-image of the spot 46 is shifted upwards with respect to the radiation source 50. By arranging a radiation-sensitive detector above and below the radiation source 50, as viewed in the Z direction of FIG. 34, and by determining the difference of the output signals of these detectors, the magnitude and direction of a focus error can be determined.

However, as is shown in FIG. 34, the path of the focus measuring beam b preferably includes a partially transmissive element 230 which reflects a part of the reflected measuring beam towards two radiation-sensitive detectors 231 and 232. The outputs thereof are connected to the inputs of a differential amplifier 233. The output signal $S_f$ thereof is determined by the position of the point of gravity of the radiation distribution on the detectors, i.e. by the focus error.

In the diagram of the method referred to as eccentric beam focus measuring method of FIG. 34, the chief ray $b_p$ of the focus measuring beam is incident on the projection lens system C, parallel to the optical axis of this system. However, it is preferably ensured, for example, by slightly rotating the radiation source 50 or by placing a wedge in front of this radiation source, that the chief ray $b_p$ is obliquely incident on the projection lens system. As compared with the methods described hereinbefore, the method then realised, referred to as the oblique beam method, has the advantage that substantially no measuring beam radiation is reflected by projection lens elements directly towards the focus error detectors so that the focus error signal has a satisfactory signal-to-noise ratio.

Figure 35:
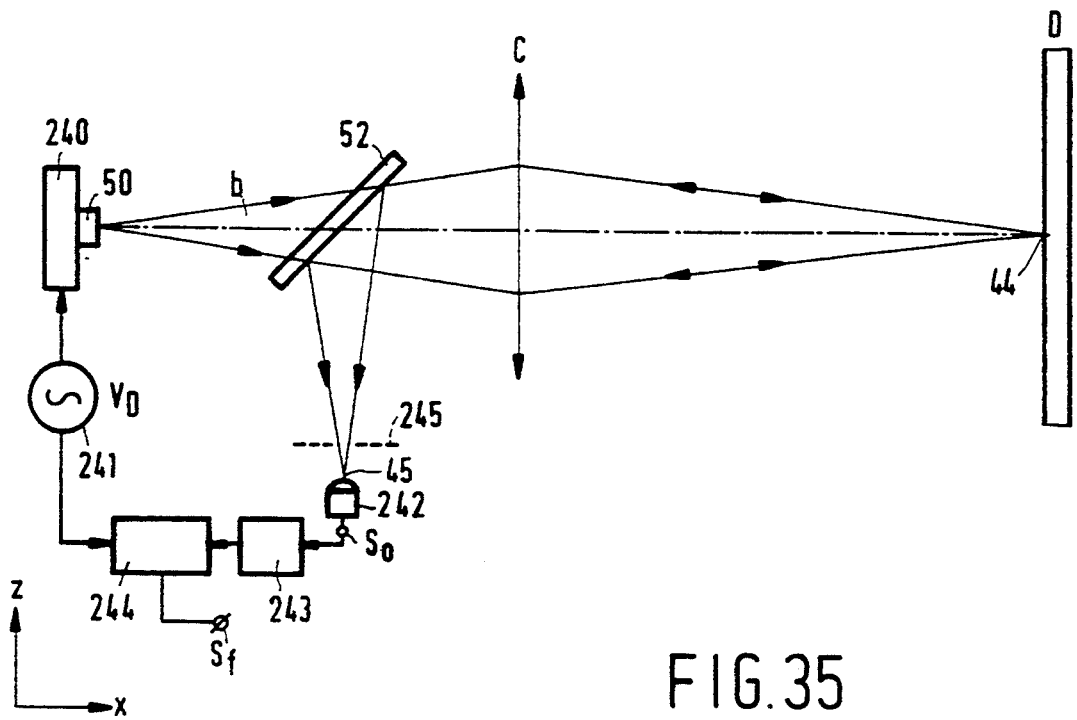
FIGS. 35 and 36 show a focus error detection system with a periodically moving measuring beam focus.

FIG. 35 shows a further embodiment of the focus error detection system. This embodiment is distinguished from all other embodiments in that only one detector is used and in that a periodically varying detector signal is generated whose frequency, phase and amplitude are a measure of the sign and the magnitude of defocusing. This periodical signal is obtained, for example by periodically moving the radiation source 50 with a small amplitude. As is shown in FIG. 35, the radiation source may to this end be arranged on a piezoelectric element 240 which is energized by a periodical voltage $V_D$ from a source 241 so that the radiation source is periodically displaced with a small amplitude along the optical axis (X axis) of the projection lens system C. The image 44 of the diode laser 50 formed by this system is then displaced periodically along the X axis so that the amplitude of the detector signal $S_o$ varies periodically.

Figure 36:
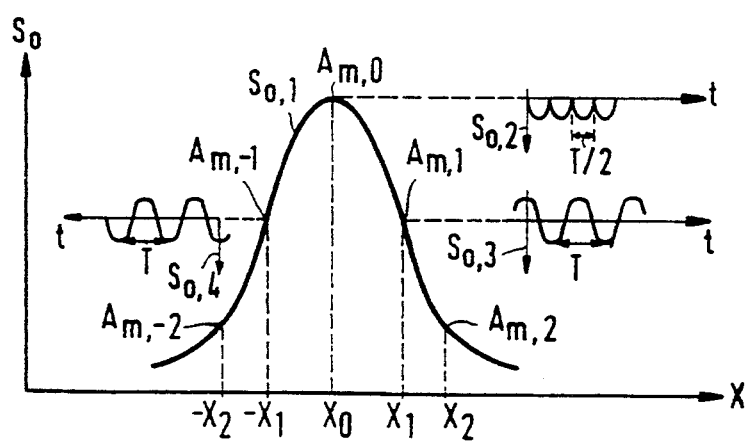
Figure 36:
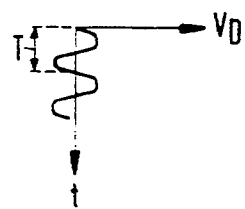

FIG. 36 illustrates the operation of the focus error detection system in accordance with FIG. 35 with reference to five diagrams. The first diagram, indicated by $S_{0,1}$, shows the variation of the amplitude Am of the detector signal as a function of the position X of the projection screen D if the voltage source 241 is switched off. The amplitude is maximal, $A_{m,0}$, if the screen is at the position of the image 44 of the radiation source 50, i.e. if the focus measuring beam b is focused on the screen. The amplitude will be smaller upon defocusing and assumes the values $A_{m,1}$, $A_{m,2}$ if the screen is shifted towards the position $X_1$, $X_2$, respectively, at one side of the image 44. When shifting the screen towards the position $-X_1$, $-X_2$, at the other side of the image 44, the amplitude of the detector signal will be $A_{m,-1}$, $A_{m,-2}$, respectively.

The lower part of FIG. 36 shows, as a function of time t, the variation of the voltage $V_D$ with which the radiation source actuator 240 is energized. This voltage has a period T. Dependent on the position of the screen, the periodical displacement of the image 44 caused by the voltage $V_D$ will have a different effect on the detector signal. As is shown in FIG. 35, this signal is applied to a filter 243 which passes the AC component only. The right-hand part of FIG. 36 shows the filtered detector signal $S_{0,2}$ which is obtained if the focus measuring beam b is focused on the projection screen. The periodical position modulation of the image 44 results in that the beam initially focused on the screen is first defocused, subsequently focused again, then defocused again, and so forth. The filtered detector signal $S_{0,2}$ thereby has a period T/2, hence a frequency which is twice that of the voltage $V_D$. If the screen is at the position $X_1$, the voltage $V_D$ results in the defocusing becoming alternately smaller and larger. The filtered output signal $S_{0,3}$ which is then obtained has a frequency which is equal to that of the voltage $V_D$ and an amplitude which is dependent on the position $X_1$. If the screen is in the position $-X_1$, i.e. the defocusing is equally large but opposite to that with the screen in the position $X_1$, a filtered detector signal $S_{0,4}$ is obtained which has the same frequency and amplitude as the signal $S_{0,3}$, but which is shifted 180° in phase.

The filtered detector signal is compared with the signal $V_D$ in a synchronous detection circuit 244, FIG. 35. If both signals have a different frequency, there will be no focus error. If the frequencies are equal, defocusing will occur whose sign is determined by comparison of the phase of the filtered detector signal ($S_{0,3}$ or $S_{0,4}$)

with that of the signal $V_D$ and whose value is given by the amplitude of the signal $S_{0,3}$ or $S_{0,4}$.

The projection lens system can be corrected again by means of the focus error signal supplied by the synchronous detection circuit.

To be able to perform this focus error detection method, the size of the radiation-sensitive surface area of the detector 242 should be equal to that of the image 45 if the focus measuring beam is focused on the screen D. Alternatively, a detector having a larger surface area may be used, provided that a diaphragm, denoted by the reference numeral 245 in FIG. 35, having an adapted aperture is arranged in the plane where the image 45 is formed upon focusing of the measuring beam b on the screen D. Instead of the diode laser 50, the diaphragm may then be periodically displaced in a direction parallel to the chief ray of the incident beam.

In order to improve the signal-to-noise ratio, it may be desirable to generate a periodically modulated focus error signal also in the focus error detection systems described hereinbefore. To this end an element which is already present in the radiation path in these systems may be periodically displaced, or an extra element may be arranged in the radiation path, which element is energized with a periodical control signal and whose ultimate effect is that the radiation received by the detectors varies periodically. For example, in the system of FIG. 34 the radiation source 50 or the detectors 231 and 232 can be displaced periodically. For example, in the system of FIG. 33 the diaphragms 224 and 225 can be synchronously displaced periodically.

In the systems shown in FIGS. 17–19, 21, 25 and 26 in which the principle of the Foucault focus error detection is used, the Foucault knife or the alternative element, viz the wedge 125, 142 or 150 or the grating 170 can be moved periodically. In the astigmatic focus error detection systems shown in FIGS. 4, 7, 9, 11–16 the astigmatic elements 60, 65, 90, 91, 100, 105, 110, 111 or 112 can be moved periodically.

Figure 37:
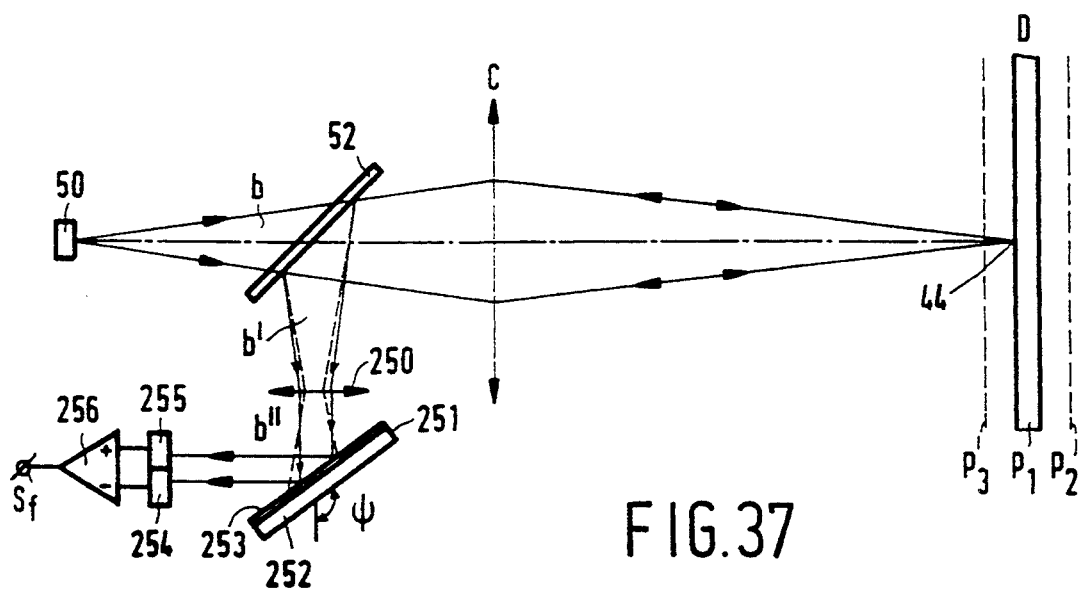
FIG. 37 shows a focus error detection system in which use is made of the principle of total or no total reflection of the measuring beam.

FIG. 37 shows the principle of a further class of embodiments of the focus error detection system according to the invention. In this class use is made of a reflecting surface arranged at an angle referred to as the critical angle. The path of the measured beam b' reflected by the projection screen D and coupled out by the beam separator 52 includes a lens 250 having such a power and being arranged at such a position that the beam b' is converted into a parallel beam b" if the focus measuring beam b is focused on the screen D. An element 251, for example a plate having such a refractive index and being arranged at an angle $\Psi$ to the chief ray of the beam b' which is slightly larger than the critical angle is arranged behind the lens 250. When the beam b is focused on the screen, the parallel beam b" is then completely reflected towards two detectors 254 and 255 which are arranged symmetrically with respect to the chief ray of the beam ". The critical angle $\Theta_g$ is given by: $\sin\Theta_g = n_2/n_1$, in which $n_1$ is the refractive index of the material 252 of the element 251 and $n_2$ is the refractive index of the surrounding medium. If the beam b" is satisfactorily collimated, i.e. if the focus measuring beam is focused on the screen, the two detectors receive the same quantity of radiation and their output signals are equal. If the screen is at the position $P_2$, the vergenee of the beam incident on the lens 250 is changed, as is illustrated by means of the broken lines above the lens 250. The beam emerging from the lens 250 is then diverging as is illustrated by means of the dashed lines below the lens 250. A part of the radiation in the right half of the beam b" is then incident on the element 251 at an angle which is smaller than the critical angle so that this radiation is no longer reflected towards the detector 255. The radiation in the left half of the beam b" is incident on the element 251 at an angle which is larger than the critical angle, so that this radiation is completely reflected towards the detector 254. The quantity of radiation on the detector 255 is then smaller than that on the detector 254 so that the focus error signal $S_f$ supplied by the differential amplifier 256 is negative. The reverse situation occurs when the projection screen is shifted towards the position $P_3$. Then the beam b' incident on the lens 250 is diverging and the beam emerging from the lens is converging so that the radiation of the left-hand part of this beam is no longer completely reflected towards the detector 254 and the signal $S_f$ is negative.

For angles of incidence proximate to the critical angle the reflection of the element 250 changes abruptly and has a discontinuity at an angle of incidence which is equal to the critical angle. The element 251 preferably consists of a substrate 252 provided with a plurality of dichroic layers. For such a layer packet the reflection coefficient changes continuously as a function of the angle of incidence for a given range of angles of incidence including the critical angle. Then less stringent requirements may be imposed on the positioning of the element 251.

Figure 38:
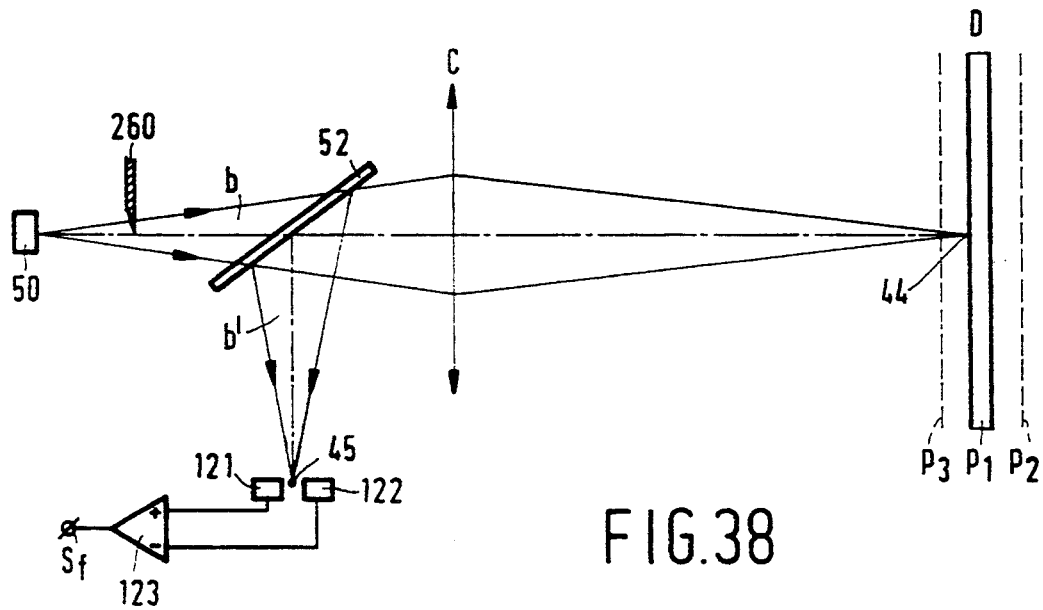
FIGS. 38 to 41 show alternative embodiments of the single Foucault focus detection principle.
Figure 39A:
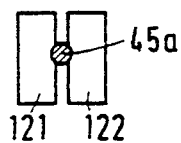
Figure 39B:
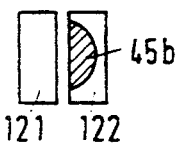
Figure 39C:
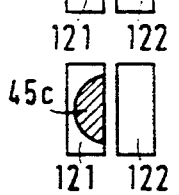

In the Foucault focus error detection systems in accordance with FIGS. 17–19, 21, 25 and 26 the Foucault knife or an alternative element, such as a wedge or a grating, is arranged in the path of the focus measuring beam reflected by the projection screen. However, as is shown in FIG. 38, it is alternatively possible to arrange a Foucault knife 260 proximate to the radiation source 50, such that this knife blocks at least half the measuring beam b so that this beam will be asymmetrical. The beam b' reflected by the projection screen D and split by the beam separator 52 forms a radiation spot 45 on the detector pair 121, 122. It has been ensured that the radiation spot is located symmetrically with respect to the detectors so that both detectors receive the same quantity of radiation if the measuring beam b is focused on the screen, i.e. the projection screen is placed at the position $P_1$. If there is defocusing, the radiation spot will become asymmetrically larger so that one of the detectors will receive an increasing quantity of radiation and the other will receive a decreasing quantity. FIG. 39b shows the radiation spot $45_b$ which is formed if the projection screen D is placed at the position $P_2$ and FIG. 39c shows the radiation spot $45_c$ which is formed when the screen D is at position $P_3$. The detectors 121 and 122 are again connected to the inputs of a differential amplifier 123 whose output signal is the focus error signal.

Figure 40:
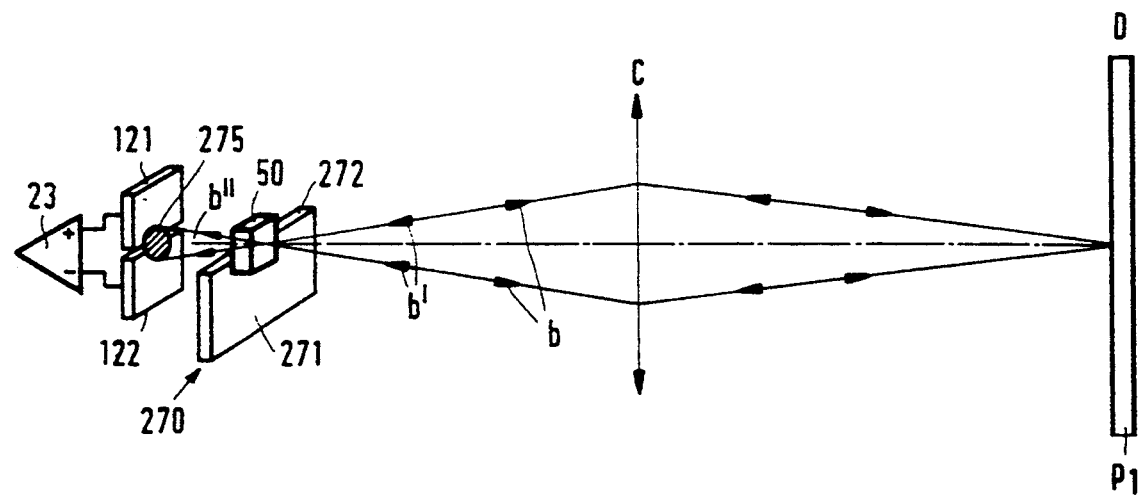

FIG. 40 shows a further embodiment of the Foucault focus error detection method. Now the fact is utilized that a diode laser also emits radiation at its rear side. The diode laser 50 is mounted on a support 270 in such a way that the center of its active layer is in the same plane as the upper side 271 of the support so that this upper side functions as a Foucault knife for the laser beam b" emerging at the rear side. The measuring beam b emitted at the front side of the diode laser 50 is focused as beam b' in the diode laser again after reflection by the screen. When the screen D is shifted, the focus of the beam b' and also the point of origin of the beam b"

are also shifted. The upper side 271 of the support 270 ensures that, upon a displacement of the point of origin of the beam b″, the radiation distribution of the radiation spot 275 formed by this beam on the detectors 121 and 122 changes so that the output signals of these detectors also change. FIG. 40 shows the situation in which the beam b is focused on the screen D. Then the radiation spot is symmetrical with respect to the detectors 121 and 122 and the output signal $S_f$ of the differential amplifier 123, whose inputs are connected to the outputs of the detectors, is zero.

Figure 41:
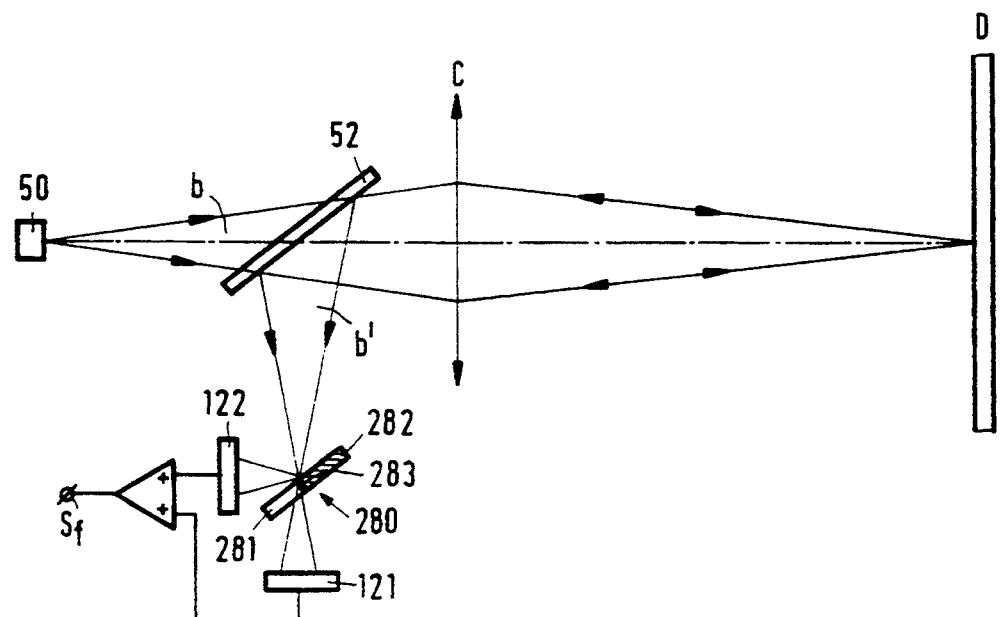

FIG. 41 shows an embodiment of a Foucault focus error detection system with a reflecting version of the Foucault knife. This knife is formed by an element 280 comprising a portion 281 which passes radiation towards a detector 121 and a portion 282 which reflects radiation towards a detector 122. There is a sharp separation 283 between the portions 281 and 282. If the beam b is focused on the screen D and the reflected focus measuring beam b′ is focused on the separation 283, the quantity of radiation which has been passed is equal to the quantity of radiation which has been reflected. Upon refocusing the ratio between passed and reflected radiation changes, and hence the ratio between the output signals of the detectors 121, 122, i.e. the signal $S_f$ also changes, dependent on the magnitude and direction of the focus error.

I claim:

1. An image projection device comprising a display system having at least a display panel for generating an image to be projected, a projection lens system for projecting the image formed by the display system on a projection screen, a focus error detection system provided with an auxiliary radiation source which supplies a focus measuring beam, and a radiation-sensitive detector for converting focus measuring beam radiation reflected by the projection screen into a focus error signal, wherein the improvement comprises that the auxiliary radiation source is arranged in a plane which, viewed from the projection lens system, effectively coincides with the plane of a display panel and emits a focus measuring beam whose radiation on its path from the radiation source to the detector traverses the projection lens system twice by the projection screen, and in that the detector is arranged in a plane which, effectively coincides with the plane-of the auxiliary radiation source.

2. An image projection device as claimed in claim 1, in which the projection lens system is a zoom lens, and wherein the focus error signal is applied to an actuator for an adjustable lens group of the zoom lens.

3. An image projection device as claimed in claim 1, wherein the auxiliary radiation source is arranged in the plane of the display panel outside said panel.

4. An image projection device as claimed in claim 1, wherein the auxiliary radiation source is arranged in a plane which is the mirror image of the plane of a display panel with respect to a partially transmissive reflector extending at an acute angle to the optical axis of the projection lens system.

5. An image projection device as claimed in claim 4, wherein the acute angle is an angle of 45° and in that the auxiliary radiation source is in alignment with said optical axis.

6. An image projection device as claimed in claim 1, wherein an astigmatic element is arranged in the part of the path of the reflected measuring radiation from the projection screen between the projection lens system and the detector and outside the path of the focus measuring beam emitted by the radiation source, and in that the detector is a four-quadrant detector.

7. An image projection device as claimed in claim 6, wherein the astigmatic element is a cylindrical lens whose cylindrical axis extends at an angle of 45° to the separating lines of the quadrant detector.

8. An image projection device as claimed in claim 6, wherein the astigmatic element is constituted by two cylindrical lenses which are arranged one behind the other in the radiation path and have different powers and mutually perpendicular cylindrical axes.

9. An image projection device as claimed in claim 6, wherein the astigmatic element is constituted by a transparent plate arranged obliquely in the reflected focus measuring beam, which plate has two facing surfaces arranged in the radiation path, a first surface of which partly reflects the focus measuring beam emitted by the radiation source towards the projection lens system.

10. An image projection device as claimed in claim 9, wherein the second surface of the plate is reflecting.

11. An image projection device as claimed in claim 10, wherein the plate is wedge-shaped.

12. An image projection device as claimed in claim 6, wherein the astigmatic element is comprise a diffraction grating whose grating period has a linear variation.

13. An image projection device as claimed in claim 6, wherein the astigmatic element comprise a diffraction grating which is arranged obliquely in the reflected focus measuring beam.

14. An image projection device as claimed in claim 13, wherein the grating is a transmission grating.

15. An image projection device as claimed in claim 13, wherein the grating is a reflecting grating.

16. An image projection device as claimed in claim 1, wherein a radiation-obstructive element is arranged in a plane in which the reflected focus measuring beam from the projection screen is focused if the focus measuring beam is focused on the screen, said element covering approximately half the reflected focus measuring beam, and in that the detector comprises two detection elements which are arranged at different sides of the chief ray of the reflected focus measuring beam.

17. An image projection device as claimed in claim 1, wherein an absorbing element coveting approximately half the focus measuring beam is arranged proximate to the radiation source, and in that the detector comprises two detection elements which are located at different sides of the chief ray of the reflected focus measuring beam.

18. An image projection device as claimed in claim 1, wherein a beam-splitting element splitting the reflected focus measuring beam into two spatially separated beam halves is arranged in the part of the path of the reflected focus measuring beam between the projection lens system and the detector and outside the path of the focus measuring beam emitted by the radiation source, and in that the detector comprises at least three detection elements which are separated by at least two strips, the detection elements located at both sides of the first strip receiving a first beam half and the detection elements located at both sides of the second strip receiving the second beam half.

19. An image projection device as claimed in claim 18, wherein the beam-splitting element is constituted by a roof prism whose rib intersects the chief ray of the reflected focus measuring beam.

20. An image projection device as claimed in claim 19, wherein the prism is arranged on a beam-separating element which separates the reflected focus measuring beam from the focus measuring beam emitted by the radiation source.

21. An image projection device as claimed in claim 18, wherein the beam-splitting element is constituted by a transparent element comprising two portions having a common base face and upper faces having opposite slopes with respect to the base face, the chief ray of the reflected focus measuring beam being located in the interface between the parts of the element.

22. An image projection device as claimed in claim 18, wherein the beam-splitting element is constituted by a diffraction grating having two grating portions which diffract the beam halves at different angles, the separating line between the grating portions intersecting the chief ray of the reflected focus measuring beam, the grating also separating the reflected focus measuring beam from the focus measuring beam emitted by the radiation source.

23. An image projection device as claimed in claim 22, wherein the grating period of one grating portion differs from the grating period of the second grating portion.

24. An image projection device as claimed in claim 22, wherein the grating strips of one grating portion extend at an angle to the separating line which is opposite to the angle at which the grating strips of the other grating portion extend to said separating line.

25. An image projection device as claimed in claim 1, wherein the detector is arranged outside the plane in which the reflected focus measuring beam is focused if the focus measuring beam is focused on the screen and in that the detector comprises a first, circular detection element situated on the chief ray of the reflected focus measuring beam and a second, annular detection element whose inner radius is larger than the radius of the first detection element.

26. An image projection device as claimed in claim 1, wherein a conical radiation-transmissive element is arranged in the part of the path of the reflected focus measuring beam from the projection screen between the projection lens system and the detector and outside the path of the focus measuring beam emitted by the radiation source, and in that the detector comprises a first, circular detection element situated on the chief ray of the reflected focus measuring beam and a second, annular detection element whose inner radius is larger than the radius of the first detection element.

27. An image projection device as claimed in claim 1, wherein the detector comprises two detection elements whose entrance apertures are located at a first and a second distance, respectively, from the projection lens system, the first and the second distance being larger and smaller, respectively, than the distance between the projection lens system and the plane in which the reflected focus measuring beam is focused if the focus measuring beam is focused on the projection screen.

28. An image projection device as claimed in claim 1, wherein the radiation source emits a narrow focus measuring beam which traverses the projection lens system eccentrically, said system receiving the reflected focus measuring beam and concentrating said beam on the detector comprising two detection elements.

29. An image projection device as claimed in claim 28, wherein the chief ray of the focus measuring beam extends at an acute angle to the optical axis of the projection lens system.

30. An image projection device as claimed in claim 1, wherein for periodically displacing the focus of the measuring beam along the optical axis of the projection lens system by a single detector having such an entrance aperture that it receives a maximum quantity of radiation if the focus measuring beam is focused on the projection screen, and by a signal processing circuit connected to the output of the detector for comparing the detector signal with a control signal for the means for periodically displacing the focus.

31. An image projection device as claimed in claim 1, wherein an element having a refractive index $n_1$ is arranged in the part of the path of the reflected focus measuring beam between the projection lens system and the detector and outside the path of the focus measuring beam emitted by the radiation source, said element being arranged at such an angle that, if the focus measuring beam is focused on the projection screen, the rays of the reflected beam are incident on the element at angles which are approximately equal to arcsin $n_2/n_1$ in which $n_2$ is the refractive index of the medium surrounding the element, and in that the detector comprises separate detection elements for the two beam halves of the reflected focus measuring beam.

32. An image projection device as claimed in claim 31, wherein the surface of the element is composed of a plurality of dielectric layers.

33. An image projection device as claimed in claim 1, in which the radiation source is a diode laser, a front face and a rear face of which emit radiation, wherein the diode laser is arranged on a first surface of a support in such a way that the plane through the center of its active layer coincides with a second surface transverse to the first support surface, and in that the detector comprises two detection elements which are located proximate to the rear face of the diode laser.

34. An image projection device as claimed in claim 16, wherein the radiation-obstructive element is constituted by an element, one half of which is reflective and the other half is radiation-transmissive and which has a sharp separation between the two portions, and in that one of the detection elements is arranged in the path of radiation passed by the element and the other detection element is arranged in the path of radiation reflected by the element.

* * * * *